United States Patent [19]
Mueller et al.

[11] Patent Number: 6,096,806
[45] Date of Patent: Aug. 1, 2000

[54] STORAGE STABLE AUTODEPOSITABLE DISPERSIONS OF EPOXY RESINS AND PROCESSES THEREFOR AND THEREWITH

[75] Inventors: Brian L. Mueller, Aurora, Ill.; Elizabeth J. Siebert, Troy, Mich.

[73] Assignee: Henkel Corporation, Gulph Mills, Pa.

[21] Appl. No.: 09/011,869

[22] PCT Filed: Aug. 7, 1996

[86] PCT No.: PCT/US96/12540

§ 371 Date: Feb. 17, 1998

§ 102(e) Date: Feb. 17, 1998

[87] PCT Pub. No.: WO97/07163

PCT Pub. Date: Feb. 27, 1997

Related U.S. Application Data

[60] Provisional application No. 60/002,782, Aug. 16, 1995.

[51] Int. Cl.$^7$ .............................. C08K 3/20; C08L 63/00
[52] U.S. Cl. ..................... 523/402; 523/335; 523/336; 523/337; 523/403; 523/404; 523/414; 523/415; 523/426; 210/291; 210/500.27; 210/511; 210/635; 210/639; 210/696; 210/768; 210/787; 210/789; 210/790; 210/806
[58] Field of Search ..................................... 523/335, 336, 523/337, 414, 415, 426, 404, 403, 402; 210/635, 639, 696, 790, 806, 787, 789, 768, 291, 500.27, 511

[56] References Cited

U.S. PATENT DOCUMENTS

| 4,123,403 | 10/1978 | Warner et al. | ........................ 523/402 |
| 5,352,726 | 10/1994 | Hall | ........................................ 524/435 |

*Primary Examiner*—Frederick Krass
*Attorney, Agent, or Firm*—Ernest G. Szoke; Wayne C. Jaeschke; Norvell E. Wisdom

[57] ABSTRACT

Epoxy resins, particularly those based on bisphenol A, can constitute the principal film forming polymer component of a storage stable autodepositable composition wherein the particle size distribution of all the film forming polymers in the composition satisfies certain criteria of size distribution, and an accelerator component which is an acid, oxidizing agent or complexing agent is present in amount sufficient to provide an oxidation-reduction potential at least 100 mV more oxidizing than a standard hydrogen electrode. Such dispersions can conveniently be prepared using a two stage process in which a solution of the film forming polymers is emulsified into water to form a preliminary dispersion and this preliminary dispersion is subjected to at least one particle size refinement stage in which the preliminary dispersion is forced through a narrow aperture.

20 Claims, No Drawings

STORAGE STABLE AUTODEPOSITABLE DISPERSIONS OF EPOXY RESINS AND PROCESSES THEREFOR AND THEREWITH This application claims the benefit of U.S. Provisional Application Ser. No. 60/002,782, filed Aug. 16, 1995, which is a 371 application of PCT/US96/12540 filed Aug. 7, 1996.

BACKGROUND OF THE INVENTION

1. Field of the Invention

This invention relates to the use of aqueous liquid compositions (either dispersions or true solutions) with which active metal surfaces can be coated, by mere contact with the liquid composition, with an adherent polymer film that increases in thickness the longer the time of contact, even though the liquid composition is stable for a long time against spontaneous precipitation or flocculation of any solid phase, in the absence of contact with active metal. (For the purposes of this specification, the term "active metal" is to be understood in its broadest sense as including all metals and alloys more active than hydrogen in the electromotive series, or, in other words, a metal which is thermodynamically capable of dissolving to produce dissolved cations derived from the metal, with accompanying evolution of hydrogen gas, when contacted with an aqueous solution of a non-oxidizing acid in which the activity of hydrogen ions is 1 equivalent per liter.) Such liquid compositions are denoted in this specification, and commonly in the art, as "autodeposition" or "autodepositing" compositions, dispersions, emulsions, suspensions, baths, solutions, or a like term. Autodeposition is often contrasted with electrodeposition, which can produce very similar adherent films but requires that the surface to be coated be connected to a source of direct current electricity for coating to occur.

In particular, this invention is concerned with autodeposition of high quality, corrosion inhibiting coatings that include epoxy resins and/or products of reaction of molecules of epoxy resins with one another and/or with other materials.

2. Statement of Related Art

It is generally believed in the art that autodeposition works because cations dissolving from the metal surface to be coated, which cations when initially dissolved are, of course, confined to the volume of contacting liquid in the immediate vicinity of the metal surface from which they are dissolving, interact with the liquid autodepositing composition in at least one of the following ways: (i) The dissolved cations precipitate previously dissolved polymers by displacing previously associated cations or cation-forming moieties, in association with which the polymers are soluble, by the newly dissolved cations in association with which the polymers are much less soluble; and/or (ii) the dissolved cations destabilize numerous individual dispersed phase units in a dispersion of a polymer with inherently low water solubility, which nevertheless can remain in stable suspension for a long time in the absence of dissolved polyvalent cations, because the outer surfaces of the dispersed phase units carry a net negative electrical charge, derived from anionic components of the dispersed polymer itself and/or from an anionic dispersing agent used to prepare the autodepositing composition in question.

The net negative charge on the units of the dispersed phase in an autodepositing liquid composition is believed to be electrically counterbalanced by a diffuse excess of cations, usually monovalent cations, in the surrounding continuous phase of the dispersion, this excess of cations together with the negative charges on the dispersed phase units constituting an example of the well known "electrical double layer" or "Helmholz double layer" that is characteristic of most interfaces between liquid phases containing charged solute particles and solids in contact with such liquid phases. As long as this double layer remains intact, the net negative charge on the exterior of each unit of dispersed phase causes it to repel other units of the disperse phase that also carry a net negative charge, and thereby prevents spontaneous coalescence of the dispersed phase units.

When the double layer is sufficiently disturbed, or in the case of a soluble polymer, when the solubility is reduced, by introduction of new cations, the polymeric parts of numerous dispersed phase units and/or solute polymer molecules can aggregate to form a continuous coating layer, if the chemical nature of the polymer favors such a transition and the temperature is sufficiently far above the glass transition temperature of the polymer concerned.

A practically useful autodepositing liquid composition therefore must have a balance between its needs for (i) stability during storage in the absence of particular kinds of metallic cations and (ii) quick transition to local instability, in the presence of the concentrations of these particular kinds of metallic cations that are developed in the vicinity of solid metals that are dissolving to produce these particular kinds of metallic cations. In the past practically successful autodepositing liquid compositions have been made from a variety of polymers, but all or almost all of them have been polymers that were initially prepared by polymerization of emulsified vinyl monomers, a process that is usually denoted in the art as "emulsion polymerization". However, by no means all polymers made by emulsion polymerization have been found useful in autodepositing liquid compositions, and some of the best protective coating properties achieved by other methods of coating have been achieved with polymers, such as urethane and epoxy resins, that have not been successfully prepared on a practical scale by emulsion polymerization. Practical success in autodepositing polymers of this type has been generally elusive heretofore.

DESCRIPTION OF THE INVENTION

Objects of the Invention

A major object of this invention is to provide autodepositing liquid compositions from which it is possible to deposit on contacted metal surfaces epoxy resin based coatings that will provide at least approximately as much protection against corrosion and against mechanical stresses as do the best quality electrodeposited coatings based on epoxy resins. Another object is to provide an at least reasonably economical method of making such autodepositing liquid compositions on a commercial scale. Still another object is to utilize the autodepositing liquid compositions provided by the invention for superior and/or more economical coating processes to produce useful articles. Other objects will be apparent from the further description below.

General Principles of Description

Except in the claims and the specific examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout unless expressly stated to the contrary: percent, amount, "parts of", and ratio values are by weight; the term "polymer" includes "oligomer", "copolymer", "terpolymer", and the like; the first definition or description of the meaning of a word, phrase, acronym, abbreviation or the like applies to all subsequent uses of the same word, phrase, acronym, abbreviation or the like and applies, mutatis mutandis, to normal grammatical variations thereof; the term "mole" and its variations may be applied to ions, moieties, elements, and any other actual or hypothetical entity defined by the number and type of atoms present in it, as well as to materials with well defined neutral molecules; the description of a group or class of materials as suitable or preferred for a given purpose in connection with the invention implies that mixtures of any two or more of the members of the group or class are equally suitable or preferred; description of preparation of autodepositing liquid compositions or components thereof by utilizing electrically neutral chemical constituents refers to the constituents at the time of first addition to any combination specified in the description, and does not necessarily preclude chemical interactions among the constituents of a mixture, or physical changes in such properties as dispersed particle sizes and distribution of materials between dispersed and continuous phases in a dispersion, after mixing has occurred; specification of materials in ionic form implies the presence of sufficient counterions to produce electrical neutrality for the composition as a whole; and any counterions thus implicitly specified preferably are selected from among other constituents explicitly specified in ionic form, to the extent possible; otherwise such counterions may be freely selected, except for avoiding counterions that act adversely to the objects of the invention.

SUMMARY OF THE INVENTION

It has been found that one of the most important characteristics determining the suitability of an autodepositing liquid composition containing dispersed epoxy resin is the size distribution of the dispersed phase units in the autodepositing liquid composition. The large number of the dispersed phase units requires in practice that the size distribution be described statistically. The most effective method of measurement and definition of particle distribution for purposes of this description has been found to be one which measures the scattering of laser generated light by particles in Brownian motion in the dispersion and relates the fluctuations in scattered light intensity to the sizes of the light scattering units (also optionally called "particles"). This type of analysis is performed by a commercially available apparatus, a NICOMP™ Model 370 Microparticle Analyzer, supplied by Particle Sizing Systems, Inc., Santa Barbara, Calif. USA, which provides a machine-generated histogram plot, and corresponding numerical data, for the volume percent of the light scattering units in the dispersion falling within various particle size ranges, and also automatically calculates various statistical measures such as the mean diameter, "effective particle size", standard deviation, coefficient of variation, cumulative volume to various limits, and the like. The machine is capable of analyzing the statistical results either according to an assumption of a Gaussian distribution or according to another method that allows for bimodal distributions. For the purposes of this specification, however, analysis according to the assumption of a Gaussian distribution is generally preferred, even when the statistics indicate a low probability that this is the actual distribution of the light scattering units. Any errors that this method of analysis may cause have not been found to substantially affect the preferences set forth below.

A closely related particle size distribution measurement technique that has also been used measures the scattering of laser generated light by particles in electrophoretic motion rather than more random Brownian motion. The particular commercial apparatus used was a ZETAPLUS™ Zeta Potential Analyzer commercially supplied by Brookhaven Instruments Corp., Austin, Tex., USA. For preferred particle size distributions, this method of analysis generally appears to give nearly the same results as the most preferred method noted in the immediately preceding paragraph. Other methods may well also be suitable, but the method described in the immediately preceding paragraph is to be understood as definitive for determining whether particular compositions conform to any description below that prescribes limits on particle size distributions.

An autodepositing liquid composition according to the present invention comprises, preferably consists essentially of, or more preferably consists of, water and:

(A) a concentration of at least 1.0%, based on the whole composition, of dispersed or both dispersed and dissolved film forming polymer molecules that include a concentration of at least 0.2%, based on the whole composition, of dispersed molecules selected from the group consisting of all organic molecules that contain at least two 1,2-epoxy moieties per molecule, all of said dispersed or dissolved and dispersed film forming polymer molecules collectively having the following size distribution characteristics, which are measured as indicated above, in the absence of other light scattering materials such as pigments, in a dispersion, or dispersion and solution, the phrase "dispersion, or dispersion and solution" being hereinafter usually abbreviated as "DDS", of the film forming polymer molecules in water:

(1) the mean light scattering particle size in the DDS is at least 100 but not more than 300 nanometres (hereinafter usually abbreviated "nm");

(2) no more than 1.0% of the light scattering particles volume in the DDS consists of particles with a diameter larger than 450 nm;

(3) no more than 25% of the light scattering particles volume in the DDS consists of particles with a diameter larger than 250 rnm;

(4) no more than 50% of the light scattering particles volume in the DDS consists of particles with a diameter larger than 200 nm; and (5) no more than 75% of the light scattering particles volume in the DDS consists of particles with a diameter larger than 175 nm;

(B) an emulsifying agent component in sufficient quantity to emulsify all dispersed constituent molecules of component (A) so that, in the autodepositing liquid composition, no separation or segregation of bulk phases that is perceptible with normal unaided human vision occurs during storage at 25° C. for at least 24 hours after preparation of the autodepositing liquid composition, in the absence of contact of the autodepositing liquid composition with any metal, particularly any metal that dissolves in the autodepositing composition to produce therein metal cations with a charge of at least two, or other material that reacts with the autodepositing liquid composition; and (C) a dissolved accelerator component, selected from the group consisting of acids, oxidizing agents, and complexing agents, sufficient in strength and amount to impart to the total autodepositing liquid composition an oxidation-reduction potential that is at least 100 millivolts hereinafter usually denoted "mV") more oxidizing than a standard hydrogen electrode (hereinafter usually abbreviated "SHE"); and, optionally, one or more of the following:

(D) a component of pigment, filler, or other dispersed solid phase materials other than the materials that constitute any part of any of the preceding components;

(E) a component of dyes or other dissolved coloring materials other than materials that constitute any part of any of the preceding components;

(F) a component of solvent in which constituents of component (A) that are insoluble in water were dissolved during some step in the preparation of the autodepositing liquid composition, other than materials that constitute any part of any of the preceding components;

(G) a component of coalescing agent, other than materials that form any part of any of the preceding components;

(H) a plasticizer component, other than materials that constitute part of any of the preceding components;

(J) a component of non-polymeric cross-linking agents and monomers that do not constitute part of any other component described above but are chemically reactive with epoxy resin constituents of component (A) at a temperature of 165° C.

In this description and hereinafter: The phrase "film forming polymer molecules" means that the molecules so described, when separated from any water in which they are dispersed or dissolved and dispersed, by drying or other removal of the water at a temperature of at least 30° C. from a substantially uniformly thick continuous liquid layer of a DDS of the film forming polymer molecules, will spontaneously form a continuous body that is solid at 30° C.; the term "solvent" means a single phase, whether consisting of a single chemical substance or a mixture of chemical substances, that (i) is liquid at 25° C. and (ii) is not constituted exclusively of water and inorganic solutes only; and the term "coalescing agent" means a material that (i) is liquid at 100° C., (ii) has a boiling point at normal atmospheric pressure that is at least 110° C. or preferably, with increasing preference in the order given, at least 120, 130, 140, 150, 160, or 165° C. and independently is not more than 300° C., or preferably, with increasing preference in the order given, not more than 290, 280, 270, 265, 260, 255, 250, 245° C., and (iii) promotes the formation of unblistered coatings, as determined by comparison of the degree of blistering obtained, under identical processing conditions, by (i) autodeposition from an autodepositing liquid composition containing the material being tested for its coalescing properties, followed by cure of the film thus deposited and (ii) an otherwise identical process in which the material being tested for its coalescing properties is replaced, in the autodepositing liquid composition used in the process, by an equal mass of water.

In addition to a complete autodepositing liquid composition as described above, another embodiment of the invention is a liquid dispersion in water of epoxy resin and, optionally, other components that is useful as a replenisher composition to replace polymer molecules consumed by use of an autodepositing liquid composition according to the invention. Such a liquid replenisher composition according to the invention comprises, preferably consists essentially of, or more preferably consists of, water and:

(A') an amount of dispersed or both dispersed and dissolved film forming polymer molecules that include the same chemical substances in the same relative proportions as are consumed during use from component (A) of the autodepositing liquid composition to be replenished, said amount being at least 5 times greater than the amount of the same chemical substances in the autodepositing liquid composition to be replenished; and (B') an emulsifying agent component in sufficient quantity to emulsify all dispersed constituent molecules of component (A') so that, in the liquid replenisher composition, no separation or segregation of bulk phases that is perceptible with normal unaided human vision occurs during storage at 25° C. for at least 5 days after preparation of the liquid replenisher composition, in the absence of contact of the liquid replenisher composition with any metal, particularly any metal that dissolves in the autodepositing composition to produce therein metal cations with a charge of at least two, or other substance that reacts with the liquid replenisher composition; and, optionally, one or more of the following:

(C') a dissolved accelerator component, selected from the group consisting of acids, oxidizing agents, and complexing agents;

(D') a component of pigment, filler, or other dispersed solid phase materials other than the materials that constitute any part of any of the preceding components;

(E') a component of dyes or other dissolved coloring materials other than materials that constitute any part of any of the preceding components;

(F') a component of solvent in which constituents of component (A) that are insoluble in water were dissolved during some step in the preparation of the liquid replenisher composition, other than materials that constitute any part of any of the preceding components;

(G') a component of coalescing agent, other than materials that form any part of any of the preceding components;

(H') a plasticizer component, other than materials that constitute any part of any of the preceding components;

(J') a component of non-polymeric cross-linking agents and monomers that do not constitute part of any other component described above but are chemically reactive with epoxy resin constituents of component (A) at a temperature of 165° C.

A process according to the invention for making a liquid replenisher composition according to the invention as described above comprises steps[1] of:

[1]The word "step" in this specification and in the claims, unless explicitly noted to the contrary, is to be understood as the equivalent of the phrase "part of a process", without any implication that all the actions recited in the step are necessarily continuous in time.

(I) providing a collection of film forming polymer molecules suitable for component (A') as described above;

(II) dissolving the entire collection of film forming polymer molecules provided in step (I) in a solvent component to form a single phase solution from the combination of the collection of film forming polymer molecules and the solvent component;

(III) emulsifying the single phase solution formed in step (II), along with other materials as needed, into a volume of water, so as to form a DDS in water of at least those parts of the solution that constitute component (A) as recited above, said DDS comprising, preferably consisting essentially of, or more preferably consisting of, water, components (A') and (B') as recited above, and, optionally, one or more of components (C') through (J') as recited above.

A process according to the invention for making an autodepositing liquid composition according to the invention as described above comprises steps of:

(I') providing a collection of film forming polymer molecules suitable for component (A) as described above;

(II') dissolving the entire collection of film forming polymer molecules provided in step (I') in a solvent component to form a single phase solution from the combination of the collection of film forming polymer molecules and the solvent component;

(III') emulsifying the single phase solution formed in step (II'), along with other materials as needed, into a volume of water, so as to form a DDS in water of at least those parts of the solution that constitute component (A) as recited above, said DDS comprising, preferably consisting essentially of, or more preferably consisting of, water, components (A) and (B) as recited above, and, optionally, one or more of components (C) through (J) as recited above; and, if component (C) as described above is not present in said DDS, (IV') adding to the DDS formed in step (III') sufficient additional material to provide component (C) and, optionally, any one or more of components (D) through (J) as recited above that is not already present in the DDS formed in step (III').

A process according to the invention for using an autodepositing liquid composition according to the invention in its simplest form comprises, preferably consists essentially of, or more preferably consists of, steps of:

(I") contacting a solid active metal surface with an autodepositing liquid composition according to the invention for a sufficient time to form over the contacted solid active metal surface a wet continuous coating which contains molecules derived from component (A) of the autodepositing liquid composition according to the invention, the wet continuous coating being sufficiently coherent and adherent to the metal surface for at least some part thereof to remain on the metal surface against the force of natural ambient gravity when the metal surface and any non-adherent part of the autodepositing liquid composition according to the invention are removed from contact with each other;

(II") after step (I"), removing the wet continuous coating formed over the metal surface from contact with any non-adherent part of the autodepositing liquid composition according to the invention with which it was contacted in step (I") and, optionally, rinsing the coating with at least one liquid rinse composition that is not an autodepositing liquid composition; and (III") after step (II"), expelling from the wet continuous coating a sufficient amount of water so as to convert the wet continuous coating into a dry continuous coating.

DESCRIPTION OF PREFERRED EMBODIMENTS

For reasons of practicality and economy with commercially available equipment, it is normally preferred to carry out process step (III') or (III") as described above in at least two stages: (0.1) a primary mixing stage in which there is formed a preliminary DDS which is sufficiently stable that no separation or segregation of bulk phases in the preliminary DDS that is perceptible with normal unaided human vision would occur during storage at 25° C. for at least 5 hours after preparation of the preliminary DDS, in the absence of contact of the preliminary DDS with any metal or other material that can react with or dissolve into the preliminary DDS to form solute cations with a charge of at least two therein; and (0.2) a particle size refinement stage, in which the preliminary DDS formed in stage (0.1), preferably before it shows any visually perceptible evidence of phase segregation, is forced as least once through a narrow aperture of carefully controlled size and shape under high pressure, so as to generate a flow velocity high enough to produce cavitation, turbulence, and/or shear forces which divide the product into particles that meet the size distribution criteria specified for component (A) or (A') above.

Stage (0.1) can be conveniently achieved by use of any of a wide variety of laboratory or commercial scale equipment known generally in the art as "high shear" or "high speed" mixers. In this stage emulsifying agent and water are generally added slowly together to the solution of the film forming polymer molecules, with constant agitation, until the mixture, which initially becomes increasingly more viscous as more water is added, at least begins to become substantially less viscous with further additions of water, indicating inversion of the emulsion from one of water in "oil" to the desired final "oil" in water emulsion, having water and constituents dissolved in water as the continuous phase. If "high shear" mixing equipment is used in this stage, the emulsion produced in this mixing stage will normally have a mean particle diameter no more than 450 nm, while if the more common "high speed" type of mixing equipment is used instead, an emulsion with a mean particle diameter of about 1000 nm is usually produced, in both cases with preferred materials as described further below.

Stage (0.2) is physically analogous to the homogenization of milk and may be accomplished with equipment suited to that and similar purposes. Preferred equipment is exemplified by RANNIE™ Hyper Homogenizers supplied by the APV Homogenizer Division of APV Corp., Wilmington, Mass., USA and MICROFLUIDIZER™ Processors supplied by Microfluidics International Corporation, Newton, Mass., USA. The operations of step (0.2) may be repeated as many times as desired, without apparent harm to the resulting product, and with substantially to slightly increased particle refinement normally being achieved with each of at least the first few repetitions. If the initial mean particle diameter of the preliminary DDS is more than 500 nm, at least one repetition of Stage (0.2) is normally preferred, in order to achieve a preferred degree of stability of the finally prepared autodepositing liquid composition, while if the initial mean particle diameter is less than 450 nm, a single mixing in Stage (0.2) is often sufficient.

The amount of component (A) in a working autodepositing composition according to the invention preferably is at least, with increasing preference in the order given, 2.0, 2.5, 3.0, 3.5, 4.0, or 4.5% of the total amount of the composition and independently preferably is not more than, with increasing preference in the order given, 50, 30, 25, 20, 10, 9.0, 8.5, 8.0, 7.5, 7.0, 6.5, 6.0, or 5.5% of the total amount of the composition.

Numerous types of epoxy resin are known in the art and may be utilized in this invention. Such resins are often described by the type of central organic moiety or moieties to which the 1,2-epoxy moieties are attached in a monomer unit having at least two epoxy moieties. Non-exclusive examples of such central moieties are those derived from bis-phenol A and its analogs in which one or two —NH$_2$ moieties are substituted for an equal number of —OH moieties in bis-phenol A; novolak condensates of formaldehyde with phenol and substituted phenols and their amino analogos, the condensates containing at least two aromatic nuclei; triazine; hydantoin; and other organic molecules containing at least two hydroxyl and/or amino moieties each, in each instance with as many hydrogen atoms deleted from hydroxy and/or amino moieties in the parent molecule as there are epoxy moieties in the molecules of epoxy resin; optionally, the 1,2-epoxide moieties may be separated from the central moieties as defined above by one or more, preferably only one, methylene groups. Oligomers of such monomers, either with themselves or with other organic molecules containing at least two hydroxyl and/or amino moieties each, may also serve as the central organic moiety.

Preferably, independently for each criterion stated, the particle size distribution of those parts of component (A) in an autodepositing liquid composition according to the invention or of component (A') in a liquid replenisher composition according to the invention that are constituted of molecules for which the epoxide equivalent weigh[2] is at least 374 conforms to the following criteria, each independently of the others, or most preferably to all: The ratio of the mean light scattering particle diameter[3] in nm divided by the cube root of the average epoxide equivalent weight for the molecules of component (A) expressed in daltons, this ratio being usually briefly denoted hereinafter as the "diameter ratio", is not more than, with increasing preference in the order given,

[2] The epoxide equivalent weight is defined as the molecular weight divided by the number of 1,2-epoxy moieties in the molecule. The epoxide equivalent weight of commercial resins is generally specified by the supplier as a range; when such materials are used, the midpoint of the stated range is taken as the epoxide equivalent weight for calculation of diameter ratios.

[3] These particle diameter values generally may most conveniently be measured in the absence of any substantial amount in component (A) of any epoxy resin for which the epoxide equivalent weight is less than or equal to 200. Such low molecular weight epoxy resins are preferably used only as crosslinking agents in formulations according to this invention, and do not need any particular precautions or special techniques to become properly suspended in the final DDS formed, because such low molecular weight epoxy resins are liquids rather than solids at the normal temperature of addition to a composition according to this invention. 29.2, 28.1, 27.0, 26.0, 25.0, 24.0, 23.5, 23.0, 22.5, 22.0, 21.7, or 21.4 $\{nm/(dalton^{1/3})\}$; no more than 1.0% of the light scattering particles volume in the distribution consists of particles with a diameter ratio larger than, with increasing preference in the order given, 44.2, 43.1, 42.0, 41.0, 40.0, 39.0, 38.0, 37.0, 36.5, 36.0, 35.5, 35.0, or 34.5 $\{nm/(dalton^{1/3})\}$; no more than 25 % of the light scattering particles volume in the distribution consists of particles with a diameter ratio larger than, with increasing preference in the order given, 25.1, 24.0, 23.0, 22.5, 22.0, 21.5, 21.0, 20.7, or 20.4 $\{nm/(dalton^{1/3})\}$; no more than 50% of the light scattering particles volume in the distribution consists of particles with a diameter ratio larger than, with increasing preference in the order given, 20.4, 19.0, 18.5, 18.0, 17.5, 17.0, 16.8, or 16.6 $\{nm/(dalton^{1/3})\}$; no more than 75% of the light scattering particles volume in the distribution consists of particles with a diameter ratio larger than, with increasing preference in the order given, 17.8, 17.3, 17.0, 16.5, 16.0, 15.5, 15.0, 14.5, 14.0, or 13.6 $\{nm/(dalton^{1/3})\}$.

Preferably, with increasing preference in the order given, at least 10, 20, 30, 40, or 45% of the molecules of component (A) of an autodepositing liquid composition according to the invention are molecules that contain at least two 1,2-epoxide moieties and have an epoxide equivalent weight of at least 374, and independently, with increasing preference in the order given, at least 10, 20, 30, 40, 50, 60, 70, 75, 80, 85, or 89% of the molecules containing at least two 1,2-epoxide moieties in component (A) of an autodepositing liquid composition according to the invention are selected from the group consisting of molecules with an epoxide equivalent weight that is at least, with increasing preference in the order given, 446, 574, 731, 873, 1015, 1158, 1299, 1442, 1584, 1726, 1868, or 2010 and independently preferably is, with increasing preference in the order given, not more than 4527, 3816, 3106, 2721, 2437, 2295, or 2152.

Independently, it is preferred that an autodepositing liquid composition according to the invention contain a subcomponent (AoJ) selected from the group consisting of molecules having exactly two 1,2-epoxide moietes and an epoxide equivalent weight that is not more than 200 in an amount that is, with increasing preference in the order given, at least 1, 2, 3, 4, 5, 6, 7, 8, 9, or 10% of the amount of molecules having two or more 1,2-epoxide moieties and an epoxide equivalent weight of at least 873 and independently, but only if at least 90% of component (A) is constituted of molecules having at least two 1,2-epoxide moieties, preferably is not more than, with increasing preference in the order given, 25, 24, 23, 22, 21, or 20% of the amount of molecules having two or more 1,2-epoxide moieties and an epoxide equivalent weight of at least 873, because excessive rinse-off of uncured wet autodeposited coatings has sometimes been observed when a higher ratio of epoxides with low epoxide equivalent weights to those with higher molecular weights was used and there was little or no other film forming material in component (A) to stabilize the wet autodeposited films. In contrast, when other film forming materials, such as those contained in most commercially available acrylic polymer latexes, are also included in substantial amounts in component (A), larger ratios of molecules with low epoxide equivalent weights may be included and can even be preferred, if the amount of other film forming polymer is sufficient to prevent excessive rinse-off of the uncured wet autodeposited films.

In addition to the diepoxide molecules of subcomponent (AoJ), component (A) and/or component (J) as described above preferably include(s) a subcomponent (CL) of crosslinking agents selected from the group consisting of both of the following molecular types:

(CL.1) molecules each containing at least two functional groups, such as amine, amide, imine, thiol, hydroxyl, carboxyl, and carboxylic acid anhydride, that are capable of rapid chemical addition reactions with epoxy moietiess when mixed with molecules containing such epoxy moieties and heated to a temperature of at least 100° C.; and (CL.2) molecules that are not part of component (CL.1) and that contain at least two blocked isocyanate groups, each such group being blocked with a conventional blocking agent or internally blocked by formation of a uretdione structure, so that the blocked isocyanate group does not react at any appreciable rate at room temperature with hydroxyl groups but does react rapidly with such groups after being unblocked by heating, unblocking occurring at a temperature that is at least 100° C. and preferably is, with increasing preference in the order given, at least 105, 110, 115, or 120° C. and independently preferably is, with increasing preference in the order given, not more than 190, 185, 180, 175, 170, or 165° C.

If subcomponent type (CL. 1) is used, its constituents preferably have terminal hydroxyl, amine, carboxylic acid, or amide groups. If subcomponent type (CL.2) is used, its constituents preferably are chosen from molecules that conform to general formula (II):

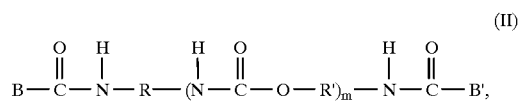

wherein each of B and B' independently is a monovalent moiety formed by removing the most easily ionized hydrogen atom from an amine, alcohol, amide, or oxide molecule, or B and B' are joined to each other to form a uretdione; each of R and R' independently is a divalent hydrocarbon or carbonyl-hydrocarbon moiety derived by removing from any hydrocarbon, or from an oxyhydrocarbon in which all oxygen atoms present are in carbonyl groups, any two hydrogen atoms not attached to the same carbon atom, said divalent hydrocarbon or carbonyl-hydrocarbon moiety having from 2 to 20 carbon atoms and having no unsaturation except aromatic and carbonyl unsaturation; and m is an integer from 0–20, preferably, with increasing preference in the order given, not more than 15, 10, 8, 6, 4, 3, 2, 1, or 0. The blocking groups B and B', which preferably are the same or are joined to form a uretdione, can be derived from any suitable aliphatic, cycloaliphatic, aromatic, or alkylaromatic monoalcohol, monoamide, monoamine, or monooxime. Ketoximes are especially useful when unblocking at relatively low temperatures such as 120° C. is desired, although their instability in acidic solutions may become a problem if an autodepositing composition according to the invention is to be stored for a considerable time without being used. More sterically hindered and/or more acid stable blocking groups, such as those derived from the lactam of 6-aminohexanoic acid and/or benzotriazole are preferred if unblocking is desired to begin at a substantial rate only at or above 160° C. In some instances, as described in the examples below, both types of blocking groups are used, in order to effect part of the cross-linking during an early part of the cure and part of the cross-linking during a later part of the cure.

The preferred cross-linking agents as specified above are believed to be reactive with hydroxyl groups as well as with any intact epoxide groups that may be present in the relatively acidic environment of an autodepositing composition according to this invention, where most or all of such groups are believed likely to be hydrolyzed to produce hydroxyl groups. Furthermore, even if epoxy groups remain as such, there will normally be at least some hydroxyl groups available for cross-linking reactions such as esterification and esterification. Other constituents of component (A) that do not contain 1,2-epoxide moieties may also, and preferably do, have hydroxyl, carboxyl, or similarly reactive groups available for cross-linking reactions.

Satisfactory autodeposited coatings for most purposes can be produced when molecules containing at least two 1,2-epoxide moieties are substantially the only constituents of component (A) as defined above. However, it is also possible, and can be advantageous, especially to achieve economy without unduly sacrificing quality, to utilize blends of the epoxy resin with other types of polymers, particularly acrylic polymers containing some acrylic acid monomer residues, which can react with the hydroxyl groups on epoxy resins to form ester groups and thereby cross-link the polymer coating formed by autodeposition.

Primarily for reasons of economy and commercial availability, it is generally preferred to utilize epoxy resins derived from bis-phenol A in this invention. More particularly, epoxy moiety containing molecules utilized in this invention preferably conform to general chemical formula (I):

invention or of component (A') in a liquid replenisher composition according to the invention constituted of molecules for which the value of n in general formula (I) above is at least one conforms to the following criteria: The ratio of the mean light scattering particle diameter in nm divided by the cube root of the average epoxide equivalent weight[4] for the molecules of component (A) expressed in daltons, this ratio being usually

[4]This value, for resins conforming to general formula I, is equal to half of the average molecular weight. The epoxide equivalent weight of commercial resins is generally specified by the supplier as a range; when such materials are used, the midpoint of the stated range is taken as the epoxide equivalent weight for calculation of diameter ratios. briefly denoted hereinafter as the "diameter ratio", of the part of component (A) or (A') constituted of molecules for which the value of n in general formula (I) above is at least one is not more than, with increasing preference in the order given, 29.2, 28.1, 27.0, 26.0, 25.0, 24.0, 23.5, 23.0, 22.5, 22.0, 21.7, or 21.4 $\{nm/(dalton^{1/3})\}$; no more than 1.0% of the light scattering particles volume in the dispersion consists of particles with a diameter ratio larger than, with increasing preference in the order given, 44.2, 43.1, 42.0, 41.0, 40.0, 39.0, 38.0, 37.0, 36.5, 36.0, 35.5, 35.0, or 34.5 $\{nm/(dalton^{1/3})\}$; no more than 25% of the light scattering particles volume in the dispersion consists of particles with a diameter ratio larger than, with increasing preference in the order given, 25.1, 24.0, 23.0, 22.5, 22.0, 21.5, 21.0, 20.7, or 20.4 $\{nm/(dalton^{1/3})\}$; no more than 50% of the light scattering particles volume in the dispersion consists of particles with a diameter ratio larger than 20.4, 19.0, 18.5, 18.0, 17.5, 17.0, 16.8, or 16.6 $\{nm/(dalton^{1/3})\}$; no more than 75% of the light scattering particles volume in the dispersion consists of particles with a diameter ratio larger than, with increasing preference in the order given, 17.8, 17.3, 17.0. 16.5, 16.0, 15.5, 15.0, 14.5, 14.0, or 13.6 $\{nm/(dalton^{1/3})\}$.

Preferably, with increasing preference in the order given, at least 10, 20, 30, 40, or 45% of the molecules in component (A) of an autodepositing liquid composition according to the invention conform to formula I when n has a value of at least 1, and independently, with increasing preference in the order given, at least 10, 20, 30, 40, 50, 60, 70, 75, 80, 85, or 89% of the molecules conforming to formula I in component (A) of an autodepositing liquid composition according to the invention are selected from the group consisting of molecules in which the average value of n in formula (I) is at least, with increasing preference in the order given, 2, 3, 4, 5, 6, 7, 8, 9, 10, 11, 12, or 13 and independently preferably is, with increasing preference in the order given, not more than 30, 25, 20, 18, 16, 15, or 14.

Independently, it is preferred that an autodepositing liquid composition according to the invention contain a subcomponent (AoJ) selected from the group consisting of diglycidyl ether molecules with an epoxide equivalent weight that is not more than 200 in an amount that is, with increasing preference in the order given, at least 1, 2, 3, 4, 5, 6, 7, 8, 9, or 10% of the amount of molecules conforming to formula (I) when n has a value of 5 or greater and independently, but only if at least 90% of component (A) is constituted of molecules conforming to formula (I), preferably is not more than, with increasing preference in the order given, 25, 24,

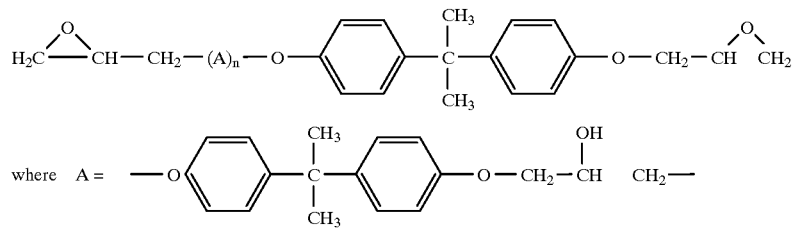

and n is an integer from 0 to 50.

Preferably, independently for each criterion stated, the particle size distribution of those parts of component (A) in an autodepositing liquid composition according to the 23, 22, 21, or 20% of the amount of molecules conforming to formula I when n has a value of 5 or greater, because excessive rinse-off of uncured wet autodeposited coatings has sometimes been observed when a higher ratio of diglycidyl ethers with low epoxide equivalent weights to the molecules conforming to formula (I) when n has a value of 5 or greater was used and there was little or no other film forming material in component (A) to stabilize the wet autodeposited films. In contrast, when other film forming materials, such as those contained in most commercially available acrylic polymer latexes, are also included in substantial amounts in component (A), larger ratios of diglycidyl ethers with low epoxide equivalent weights may be included and can even be preferred, if the amount of other film forming polymer is sufficient to prevent excessive rinse-off of the uncured wet autodeposited films.

Most preferably, the diglycidyl ether of bisphenol-A, corresponding to general formula (I) when n=0 and having an epoxide equivalent weight of 182 daltons is used as subcomponent (AoJ). Subcomponent (AoJ) when present will form part of component (A) and/or part or all of component (J) as described above.

When subcomponent (CL.2) is present in an autodepositing liquid composition according to the invention in which substantially all of the molecules containing at least two 1,2-epoxide moieties conform to general formula (I), the ratio of (i) the number of gram-equivalents of the total of epoxy and hydroxyl groups in that part of component (A) that conforms[5] to general formula (I) to (ii) the number of gram-equivalents of the total of isocyanate and blocked isocyanate groups in subcomponent (CL.2) preferably is, with increasing preference in the order given, at least 1.0, 2.0, 3.0, 3.5, 3.8, 4.0, or 4.1 and independently preferably is, with increasing preference in the order given, not more than 50, 45, 40, 35, 30, 28, 26, 24, 23, 22, 21, or 20.

[5]As with all other materials as already noted generally above, the word "conforms" in this instance is to be interpreted as "conformed at the time of first addition to a mixture as described herein." Therefore, even if the terminal epoxy groups in general formula (I) have hydrolyzed after addition, these groups are still counted for purposes of the calculation described in this paragraph as single epoxy groups rather than as the up to two hydroxyl groups that they may have become after addition.

Satisfactory autodeposited coatings for most purposes can be produced when epoxy resins, particularly those constituted of molecules conforming to general formula (I), are substantially the only constituents of component (A) as defined above. However, it is also possible, and can be advantageous, especially to achieve economy without unduly sacrificing quality, to utilize blends of the epoxy resin with other types of polymers, particularly acrylic polymers containing some acrylic acid monomer residues, which can react with the hydroxyl groups on epoxy resins to form ester groups and thereby cross-link the polymer coating formed by autodeposition.

Component (B) preferably includes a subcomponent (B.a), which may be the only constituent of component (B), selected from the group consisting of anionic surfactants, and in many circumstances it may advantageously contain other types of emulsifying agents also. Preferred anionic surfactants are ether sulfates that conform to general formula (III):

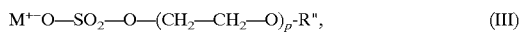

$$M^+{-}O{-}SO_2{-}O{-}(CH_2{-}CH_2{-}O)_p{-}R'',\qquad\text{(III)}$$

where $M^+$ represents a monovalent cation or monvalent fraction of cation of higher valence, preferably sodium or ammonium, more preferably ammonium; p is a positive integer that preferably is at least, with increasing preference in the order given, 2, 3, or 4; and R" represents an alkyl or alkylaryl moiety, more preferably an alkyl phenol moiety. Independently R" preferably has at least, with increasing preference in the order given, 8, 10, 12, 13, 14, or 15 carbon atoms and independently preferably has not more than, with increasing preference in the order given, 30, 28, 26, 24, 22, or 20 carbon atoms. Suitable commercially available anionic emulsifiers include Dowfax™ 2A-1 (sodium salt of alkylated diphenyl oxide disulfonate); Abex™ 26-5; Texapon™ E-12 and K-1 2; Rhodapex™ CO-128, -433, and -436 and EP-100, -110, -1 15, -120, and -227; Disponsil™ AES-13, and Aerosol™ OT (sodium dioctylsulfosuccinate). The single most preferred anionic emulsifying agent is Rhodapex™ CO-436, which is reported by its supplier to be an ammonium salt of sulfonated nonylphenol ethoxylate and to contain 58% of this active ingredient. The preferred amount of active anionic emulsifying agent used is, with increasing preference in the order given, not less than 0.1, 0.3, 0.5, 0.7, 0.9, 1.1, 1.3, 1.4, or 1.5%, based on the content in an autodepositing liquid composition according to the invention of the sum of molecules conforming to general formula I and any other parts of component (A) that do not include sufficient anionic moieties in the polymer molecules themselves to be "self-emulsifying"[6], and independently preferably is, with increasing preference in the order given, not more than 5, 4, 3.0, 2.7, 2.4, 2.2. 2.0, 1.9, 1.8, or 1.7%, on the same basis.

[6]As described in detail in U.S. Pat. No. 5,352,726 of Oct. 4, 1994 to Hall at column 6 lines 31–44, column 7 line 11 through column 8 line 7, and column 8 line 64 through column 9 line 23, which portions are, to the extent not inconsistent with any explicit statement herein, hereby incorporated herein by reference, when utilizing addition polymers of vinyl monomers as the principal ingredient of the binder for an autodepositing liquid composition, the emulsifying agent is preferably incorporated into the polymer chain. Any polymers of this type that are present as part of component (A) herein do not need "external" emulsifying agent component (B) as described herein.

Accelerator component (C) is preferably chosen from the group consisting of hydrofluoric acid and its salts, fluosilicic acid and its salts, fluotitanic acid and its salts, ferric ions, acetic acid, phosphoric acid, sulfuric acid, nitric acid, hydrogen peroxide, peroxy acids citric acid and its salts, and tartaric acid and its salts. More preferably, the accelerator comprises, still more preferably consists essentially of, or most preferably consists of the following subcomponents:

(C.1) a total amount of fluoride ions, which may be simple or complex fluoride ions or both, that provides a concentration thereof in the total autodepositing liquid composition of at least 0.4 g/L and more preferably of, with increasing preference in the order given, at least 0.6, 0.8, 1.0, 1.2, 1.4, 1.6, 1.8, or 1.9 g/L and independently preferably provides to the autodepositing liquid composition a total concentration of fluoride ions that is, with increasing preference in the order given, not more than 5, 4.5, 4.0, 3.7, 3.4, 3.1, 2.9, 2.7, 2.5, 2.3, or 2.1 g/L;

(C.2) an amount of dissolved trivalent iron atoms that is at least 0.003, or, with increasing preference in the order given, at least 0.007, 0.010, 0.013, 0.016, 0.019, 0.022, 0.025, or 0.027 and independently preferably is, with increasing preference in the order given, not more than 0.20, 0.15, 0.11, 0.090, 0.070, 0.055, 0.045, 0.040, 0.035, or 0.030; and (C.3) a source of hydrogen ions in an amount sufficient to impart to the autodeposition composition a pH that is at least 1.6, or preferably is, with increasing preference in the order given, at least 1.7, 1.8, 1.9, 2.0, or 2.1 and independently preferably is, with increasing preference in the order given, not more than 5, 4.5, 3.8, 3.6, 3.4, 3.2, 3.0. 2.8, 2.6, 2.4, or 2.3; and, optionally, (C.4) hydrogen peroxide.

It should be understood that subcomponents (C.1) through (C.3) need not all be derived from different materials.

Hydrofluoric acid, in particular, is preferred as a source for both (C.1) and (C.3), and ferric fluoride can supply both (C.1) and (C.2).

Independently of other preferences, an autodepositing liquid composition according to the invention, when used to coat bare steel, preferably has an oxidation potential, measured by the potential of a platinum or other inert metal electrode in contact with the autodepositing liquid composition, that is, with increasing preference in the order given, at least 150, 175, 200, 225, 250, 275, 290, or 300 mV more oxidizing than a SHE and independently preferably is, with increasing preference in the order given, not more than 550, 525, 500, 475, 450, 425, 410, or 400 mV more oxidizing than a SHE.

Pigment and/or filler component (D) and soluble colorant component (E) may generally be selected for compositions according to this invention from materials established as satisfactory for similar uses in other autodepositing liquid compositions.

Solvent component (F) is generally required in the preparation of autodepositing liquid compositions according to this invention, but it is not believed in most cases to contribute any desirable characteristic to the final autodepositing liquid compositions formed, although it may function as a coalescing agent. The preferred solvents, however, are not particularly effective coalescing agents when used alone. The solvent component may be removed, when desired or necessary to comply with anti-pollution requirements, by means known in the art, such as distillation under reduced pressure after formation of an oil-in-water type dispersion of the desired final components of an autodepositing liquid composition according to the invention. However, in many cases the solvents do not diminish the technical benefits of the final autodepositing liquid compositions according to the invention, and may be left in place in the autodepositing liquid compositions according to the invention if legal requirements are not thereby violated. Any such residual solvent will normally be expelled during cure of the autodeposited coatings.

The most preferred solvents are mixtures of (i) aromatic hydrocarbons with from 6 to 10 carbon atoms and (ii) ketones with from 3 to 8 carbon atoms. Preferably, with increasing preference in the order given, the percentage of each of components (i) and (ii) in the mixture is at least 10, 20, 25, 30, 35, 40, or 45%. The single most preferred constituent of type (i) is toluene and the single most preferred constituent of type (ii) is methyl isobutyl ketone.

Generally, the presence of a coalescing agent component (G) in an autodepositing liquid composition according to the invention is preferred. This component is preferably selected from the group consisting of monoethers and monoesters of glycols, preferably glycols with at least one terminal hydroxy group. Monoethers of ethylene glycol are readily available and effective in blistering reduction but are restricted in use by anti-pollution laws in many locations and also have been found to be more likely than monoethers of propylene glycol to destabilize the emulsions formed in products according to the invention, so that monoethers of propylene glycol, particularly the n-butyl and phenyl monoethers of propylene glycol, are preferred from this class. When glycol monoethers are used, their percentage in an autodepositing liquid composition according to the invention preferably is, with increasing preference in the order given, at least 5, 10, 12, 14, 16, 18, or 19% of the total solids in components (A) and (J) (or (A') and (J')) of the composition and independently preferably is, with increasing preference in the order given, not more than 30, 28, or 26% on the same basis. Monoesters are slightly less preferred than monoethers where maximum corrosion resistance in the final product is needed, but are generally effective at lower concentrations and may therefore be preferred if economy and/or compliance with stringent solvent emission standards is more important than maximum corrosion resistance. A particularly preferred monoester is 2,2,4-trimethyl-1,3-pentanediol mono 2-methyl propionate. This and other monoesters if used preferably are present in an amount of at least 0.5% of the total autodepositing liquid composition and more preferably, with increasing preference in the order given, are present in amounts of at least 1.0, 1.5, 2.0, 2.5, or 2.9% but, independently, not more than with increasing preference in the order given, 10, 8.0, 6.0, 5.0, 4.5, 4.0, 3.5, or 3.1%.

The invention and its benefits may be further appreciated from consideration of the examples and comparisons below.

GENERAL PROCEDURES APPLICABLE TO MANY SPECIFIC EXAMPLES

Preparation of Epoxy Resin Dispersions—with Microfluidizer™ Apparatus as the Only Dispersing Apparatus A total of 1 part of epoxy resin(s), cross-linking agent(s), and water-insoluble coalescing agent(s) if the latter were used, and any other substantially water insoluble liquid materials desired in the dispersion was dissolved in a mixture of 1 part each of toluene and methyl isobutyl ketone, with agitation if needed until a homogeneous organic solution was achieved. A separate aqueous solution of the emulsifying agent component in 6 parts of deionized (hereinafter usually abbreviated "DI") water was also prepared. (The proportions between or among the epoxy resin (s), cross-linking agent(s), emulsifying agent(s), and other material(s) used in individual instances is shown in tables below.)

The organic solution prepared as noted was then introduced into the injection port of a Model 110F MICROFLUIDIZER™ dispersing apparatus, and the aqueous solution prepared as noted above was added to the reservoir of the same apparatus. The air pressure supply to the apparatus was raised to the maximum level, and an empty container of adequate size was placed to receive the dispersion output from the apparatus. The MICROFLUIDIZER™ apparatus was then operated according to directions supplied with it to produce an output dispersion; if necessary, because of the total volume of the dispersion to be prepared, additional amounts of the aqueous and organic solutions prepared as described next above were added to the apparatus until all of both solutions had passed once through the dispersion mechanism of the apparatus.

The primary dispersion prepared as described next above was then reintroduced into the reservoir only of the MICROFLUIDIZER™ apparatus and passed through it again, with no new material injected, for further particle size refinement. The initially refined dispersion was normally passed through again, and the entire process repeated, with the output dispersion from each repetition becoming the input dispersion for the next repetition, until all material in the dispersion had passed through the MICROFLUIDIZER™ apparatus four to eight times, to produce a finally refined high volume dispersion.

This high volume dispersion was then introduced into a conventional rotary evaporator apparatus, in which rotation at a rate of 2–5 revolutions per minute (hereinafter usually abbreviated "rpm") was begun and the overpressure was initially reduced to about 85 millibars. The vapor evolved from the dispersion in the rotary evaporator apparatus was condensed and collected in a volume graduated container, and overpressure was gradually reduced, with care to avoid an extent of foaming that would carry non-vaporized material past the trap for such material in the apparatus, until a volume of liquid that would, if it were pure water, have a mass of 50% of the original aqueous and organic solutions from which the dispersion was made, had collected. (The collected liquid in fact includes much or all of the organic solvents from the organic solution used to make the high volume dispersion, in addition to water.) Evaporation was then discontinued by admitting atmospheric air to return the overpressure in the apparatus to the prevailing ambient pressure. The unevaporated dispersion remaining in the rotary evaporator apparatus was then retained as concentrated dispersion and was assumed to contain all of the originally added materials that are substantially less volatile than water. Any water-soluble coalescents used were post-added with stirring for 2 to 2.5 hours to these concentrated dispersions.

Preparation of Autodepositing Liquid Compositions from the Dispersions as Above

An amount of concentrated dispersion to provide solids that will constitute 5% of the final autodepositing liquid composition was dissolved in an amount of DI water that together with the concentrated dispersion, constituted about 90% of the desired final volume of the autodepositing liquid composition. To this was added, with high mechanical agitation, but avoiding any splashing or foaming, a concentrated solution of ferric fluoride, hydrofluoric acid, and hydrogen peroxide in amounts sufficient to provide 1.9 g/L of dissolved fluoride ions and 0.027 M of iron(III) atoms after final dilution to the desired volume with more DI water, and to give the final autodepositing liquid composition an oxidation-reduction potential that is 350±50 mV more oxidizing than a SHE.

Preparation and Processing of Test Specimens

Rectangular test panels of cold rolled steel sheets, with a hole for hanging near the center of one of the shorter ends, were the usual substrates coated.

Maintenance of Autodepositing Liquid Composition During Use

The bath temperature was measured using a dialface thermometer with a sensing element encased in stainless steel. The operating temperature was maintained within the range of 21 to 24° C.

The oxidation-reduction potential was constantly monitored with an appropriate instrument and electrodes as known to those skilled in the art. Hydrogen peroxide solution in water was added as necessary to maintain the oxidation-reduction potential of the autodepositing liquid composition within the range of 350±50 mV.

A reading of free fluoride ions activity as measured by a LINEGUARD® 101 Meter and associated free fluoride sensitive electrode (commercially available from Orion Instruments) was made bi-hourly. Dilute hydrofluoric acid in water was added as necessary to maintain the free fluoride activity within a specified operating range of 250±25 micro-amperes.

The total solids content of the autodepositing liquid composition was measured at least as often as every 24 hours when the autodepositing liquid composition was used for an extended period of time, and additional amounts of concentrated dispersion of epoxy resin prepared as described above were added as needed to maintain the percent solids within the range of 5.0±0.5.

Test Methods for Coated Substrates

Initial adhesion was measured according to method General Motors 9071P and adhesion after water soak (for 2 hours at 38° C.) was measured according to American Society for Testing and Materials (hereinafter usually abbreviated "ASTM") Method B117-85. Reverse impact was performed according to ASTM Method D 2794-84. Brake fluid resistance was measured by monitoring changes in coating Pencil Hardness using General Motors DELCO™ Supreme 11 (Department of Transportation Classification 3) brake fluid at room temperature. Thermal stability of the epoxy coatings was measured by heating the panels in a conventional oven for a specified length of time, followed by measuring reverse impact and brake fluid resistance after specified times.

Specific Composition Examples—Group I

The basic epoxy resin modifiers tested are described in Table 1 below, and some physical parameters of various coalescing agents used in this group are given in Table 2 below. Table 3 below, in which the abbreviation "N.m." means "Not measured", contains various coating parameters and corrosion test data for the various coalescing agents with crosslinked Epon™ 1007, a mixture of oligomers of the diglycidyl ether of bisphenol-A with an average epoxide equivalent weight of about 2000 and a corresponding average of about 13 hydroxyl functional groups per chain. Hills Vestagon™ B 1530 is an isophorone diisocyanate-based, $\epsilon$-caprolactam blocked isocyanate; it was used as a cross-linking agent in each instance shown in Table 3, at a ratio of (1 007):(B 1530)=80:20. The emulsifying agent was 2.7%, based on epoxy resin solids together with cross-linking agent solids if any, of Rhodapex™ CO-436 (as supplied, with 58% active emulsifying agent). Cure conditions were 190° C. for 40 minutes, chosen with the expectation that these conditions would achieve the maximum amount of cross-linking practically possible with the compositions used.

TABLE 1

| Modifier Trade Name | Chemical Type/Description | Supplier |
|---|---|---|
| Epon ™ 828 | Liquid BPA-Based ER; EEW = 185–192 | Shell Chem. Co. |
| Epon ™ 872 | Semi-Solid Chemically-Modified BPA-Based Flexible ER; EEW = 650–750 | Shell Chem. Co. |
| Epon ™ 1020-A-80 | ~20% Brominated BPA-Based ER; EEW = 455–475 | Shell Chem. Co. |
| Epon ™ 1031 | Solid BPA-Based ER of Functionality = 4; EEW = 200–240 | Shell Chem. Co. |
| Kraton ™ RP-6565 | 70–95% Epon ™ 828 ER and 5–30% Rubber-Modified ER | Shell Chem. Co. |
| XP 71739.00 | Phosphate Ester of Epon ™ 1004-Type ER | Dow Chem. Co. |
| Araldite ™ GT-7099 | Solid High MW BPA-Based ER | Ciba-Geigy |
| PKKM ™ 301 | Phenoxy Resin; Modified Poly (hydroxyether); MW > ~10,000 | Phenoxy Assoc. |
| Heloxy ™ 68 | DGE of Neopentyl Glycol; EEW = 130–140; BP > 148° C. | Shell Oil Co. |
| Heloxy ™ 107 | DGE of Cyclohexane Dimethanol; EEW = 155–165; BP > 148° C. | Shell Oil Co. |
| Lumiflon ™ 400 | Crosslinkable Fluoropolymer Resin | Zeneca Corp. |

Acronyms and Other Abbreviations for Table I
BPA= Bisphenol-A; ER= epoxy resin; EEW= epoxide equivalent weight; Chem. Co.= Chemical Company; MW= molecular weight; Assoc.= Associates; DGE= diglycidyl ether.

TABLE 2

| | | Molecular | Boiling Point, | % in Saturated Aqueous |
|---|---|---|---|---|
| Coalescing Agent | | | | |
| Trade Name | Chemical Name | Weight | °C. | Solution |
| Dowanol ™ PM | Propylene glycol monomethyl ether | 90.1 | 120.1 | Miscible |
| Dowanol ™ PtB | Propylene glycol monomethyl ether | 132.2 | 151* | 14.5 |
| Dowanol ™ PnB | Propylene glycol monomethyl ether | 132.2 | 170.2 | 6.4 |

TABLE 2-continued

| Coalescing Agent | | Molecular Weight | Boiling Point, °C. | % in Saturated Aqueous Solution |
|---|---|---|---|---|
| Trade Name | Chemical Name | | | |
| Dowanol ™ DPnB | Dipropylene glycol mono-n-butyl ether | 190.3 | 229 | 5 |
| Dowanol ™ TPM | Tripropylene glycol monomethyl ether | 206.3 | 242.4 | Miscible |
| Dowanol ™ PPh | Propylene glycol monophenyl ether | 152.2 | 242.7 | 5.4 |
| Texanol ™ | 2, 2, 4-trimethyl-1, 3-pentanediol mono-2-ethyl propionate | 216.3 | 244–247 | <0.1 |

Footnote for Table 2
*This material forms an azeotrope with water that boils at 95° C.

TABLE 3

| Concentration of Coalescing Agent, % of Solids in Resin and Cross-Linking Agent(s) | Concentration of Reagent in Post-rinse | Adhesion Test Value, Initial/After WS | Pencil Hardness | Brake Fluid Resistance | Reverse Impact | 500 Hours Salt Spray Results | Scribe/Scab 20 Cycle Test Results |
|---|---|---|---|---|---|---|---|
| None | None | 0/0 | 4H | 8 Hours | 160 | 5–5 | 55% Peel |
| " | 0.1% Ammonium citrate | 0/0 | 4H | 0.5 Hour | 160 | 6–6 | N.m. |
| 15% of Dowanol ™ PM | None | 0/0 | 4H | 4 Hours | 160 | 9–10 | 55% Peel |
| " | 2% BONDERITE ® 958R | N.m. | 4H | 2 Hours | N.m. | N.m. | N.m. |
| 15% of Dowanol ™ TPM | None | N.m. | N.m. | N.m. | N.m. | N.m. | 75% Peel |
| 3% of Texanol™ | None | 0/0 | 4H | 8 Hours | 160 | N.m. | 45% Peel |
| " | 0.1% Ammonium citrate | 0/0 | 4H | 8 Hours | 160 | 7–7 | >21; 20% Peel Bottom |
| 15% of Dowanol ™ PnB | None | 0/0 | 4H | 8 Hours | 160 | N.m. | 80% Peel |
| " | 0.1% Ammonium citrate | 0/0 | 4H | ~4 Hours | 160 | N.m. | N.m. |
| 20% of Dowanol ™ PnB | None | 0/0 | 4H | 8 Hours | 160 | 6–8 | 5–6; 40% |
| " | 0.1% Ammonium citrate | 0/0 | 4H | 8 Hours | 160 | N.m. | 15;40% Peel Bottom |
| 25% of Dowanol ™ PnB | None | 0/0 | 4H | 8 Hours | 160 | 9–9 | 21; 20% Peel Bottom |
| " | 0.1% Ammonium citrate | 0/0 | 4H | 8 Hours | 160 | N.m. | 12; 35% Peel Bottom |
| 15% of Dowanol ™ DPnB | None | 1/0 | 4H | 8 Hours | 160 | 6–7, 16s | 80% Peel |

TABLE 4

| Concentration of Coalescing Agent, as % of Solids in Resin and Cross-Linking Agent(s) | Concentration of Reagent in Post-rinse | Concentration of Flow Modifier, as % of Solids in Resin and Cross-Linking Agent(s) | Brake Fluid Resistance | 500 Hours Salt Spray Results | Scribe/Scab 20 Cycle Test Results |
|---|---|---|---|---|---|
| 15% of Dowanol ™ PnB | None | None | <0.5 Hour | 6–7, 21s | 95% Peel |
| " | 0.1 % Ammonium citrate | " | <0.5 Hour | 4–5, 11s | 17; 20% Peel Bottom |
| " | None | " | <0.5 Hour | 9–10 | 25; 20% Peel Edge |
| " | None | 1% FC 430 | <0.5 Hour | N.m. | N.m. |
| " | 1.1% Ammonium citrate | " | <0.5 Hour | N.m. | 80% Peel |
| " | None | 1% FC 171 | N.m. | N.m. | N.m. |
| " | 0.1% Ammonium citrate | " | <0.5 Hour | 3–3, 10s; 75% Peel | N.m. |
| " | None | 1% SURF 61 | N.m. | 6–8, 18s | 100% Peel |
| " | 0.1% Ammonium citrate | " | 0.5 Hour | 5–6, 14s | 70% Peel |
| " | None | 1% SURF 82 | 0.5 Hour | 4–4, 8s | 90% Peel |
| " | 0.1% Ammonium citrate | " | <0.5 Hour | 8–12, 24s | N.m. |
| 15% of Dowanol ™ DPnB | None | None | 4 Hours | 8–9, 14s | 95% Peel |
| " | 0.1% Ammonium citrate | " | <0.5 Hour | 95% Peel | 65% Peel |

Table 4 shows the same kind of data as Table 3, except that for Table 4 the base epoxy resin was Epon™ 1004 instead of 1007. Epon™ 1004 is also reported by its supplier to be a mixture of oligomers of the diglycidyl ether of bisphenol-A but has an average epoxide equivalent weight of 875 and a corresponding average of about 5 hydroxyl groups per molecule. The ratio of (1004):(B 1530) was 86.3:13.7. All other conditions not specifically noted in Table 4 were the same as for Table 3.

Various cure conditions, including two-stage cures, were explored with the combination of Epon™ 1004 epoxy resin and Vestagon™ B 1530 cross-linking agent, in a ratio of 86.3/13.7; the working autodepositing liquid composition also contained 15% of Dowanol™ PnB coalescent, and a DI water postrinse was used. Cleavage of the ε-caprolactam blocking group from the crosslinking agent begins at 160° C. when mixtures containing it are heated from a lower temperature. One-stage cure conditions of 170, 180, 185, and 190° C. for 40 minutes were investigated. Also 185° C. cures for 30, 35 and 40 minutes were compared. Two-stage cures involving 10- and 20-minutes of precure at 120, 140, and 150° C. followed by 30 minutes at 185° C. were also investigated. A lower-temperature first-stage cure allows water to leave the coating before deblocking of the isocyanate. (Although lower temperature pre-cures were tried, 120° C. was the minimum temperature at which film formation occurred.) Some results are shown in Table 5 and its notes.

In order to establish a baseline on the effect of various epoxy modifiers on coatings, a wide variety of modifiers as shown in Table 1 were screened, at the same Dowanol™ PnB coalescing agent levels (15% for Epon™ 1004 and 20% for Epon™ 1007). A mixed cross-linking agent, consisting of Vestagon™ B 1530 as before and Bayer Desmodur™ BL 3175A, which is methyl ethyl ketoxime-blocked hexamethylene diisocyanate with a deblocking temperature of 120° C., in a ratio of 57:43 was used unless otherwise indicated. Various reaction rinses and in some cases simply DI water rinses after autodeposited coating formation were used as shown in Table 6. Some test performance data are also shown in Table 6. All examples in this Table also had 0 adhesive loss both initially and after 2 hours of water soaking, initial pencil hardness values of 4 H after curing, and reverse impact test values of 160 before aging with heat as shown in the

TABLE 5

| Curing Conditions, Temperature in ° C./Time of Exposure to Temperature | Brake Fluid Resistance | Salt Spray, 1000 Hours | Scribe/Scab, 20 Cycle |
| --- | --- | --- | --- |
| 120/10 minutes followed by 185/30 minutes | <0.5 Hour | 90% Peel | 22 |
| 120/20 minutes followed by 185/30 minutes | <0.5 Hour | 5–8, 15s | 28 |
| 140/10 minutes followed by 185/30 minutes | <0.5 Hour | 714 11; 99% Peel | 27; 90% Peel |
| 140/20 minutes followed by 185/30 minutes | <0.5 Hour | 4–7 | 24 |
| 150/10 minutes followed by 185/30 minutes | <0.5 Hour | 3–6, 10s | 26 |
| 150/20 minutes followed by 185/30 minutes | <0.5 Hour | 4–4, 14s | 24 |
| 170/40 minutes | <0.5 Hour | 4–7, 16s | 20 |
| 180/40 minutes | <0.5 Hour | 8–12,20s; 40% Peel | 31 |
| 185/30 minutes | <0.5 Hour | 5–10, 10% Peel | 30 |
| 185/35 minutes | <0.5 Hour | Not measured | Not measured |
| 185/40 minutes | <2 Hours | 3–9, 10% Peel | 27 |
| 190/40 minutes | >4 Hours | 5–12, 31s; 45% Peel | 49 |

Notes for Table 5
All cures shown also produced the following results: Good appearance of the coating; 0 loss of adhesion both initially and after 2 hours of water soaking; pencil hardness of 4H; and a reverse impact test value of 160. The autodepositing liquid composition was stable for at least two weeks, during which a total amount of metal surface corresponding to 1 square meter per liter of initial autodepositing liquid composition was coated with the composition.

TABLE 6

| Modifier and Concentration | CoCA | Reagent in Postrinse if Any | Initial Brake Fluid Resistance | Values After Heat Treating 65 Hours at 177° C. | | Results after 500 Hours Salt Spray | Results after Scribe/Scab 20 Cycles |
| --- | --- | --- | --- | --- | --- | --- | --- |
| | | | | Reverse Impact | Pencil Hardness after 6 Hours in Brake Fluid | | |
| Part A: With Epon ™ 1007 | | | | | | | |
| None | 25% | None | 2 Hours | 140 | 6H | 3-4, 6s | 14 |
| None | " | B 958 (2%) | 0.5 Hour | 80 | 3H | 3-4, 9s | 19 12, 27 |
| None | 20% | None | 2 Hours | 160 | 6H | N.m. | N.m. |
| None[1] | " | 0.1% NH$_4$HCO$_3$ | 2 Hours | N.m. | N.m. | 30% Peel | 15 |
| None | " | B 958 (2%) | 2 Hours | 100 | H | 6-8, 17s | 19 |
| Epon ™ 828 (10%)[1] | <25% | None | 4 Hours | N.m. | N.m. | 5-5 | 22 |
| Epon ™ 828 (10%) | " | 0.1% NH$_4$HCO$_3$ | 2 Hours | 100 | 3H | 3-4, 6s | 12 |
| " | " | B 958 (2%) | 2 Hours | <20 | 3H | 3-4 | 12 |
| PKHM ™ 301 (10%) | 20% | 0.1% NH$_4$HCO$_3$ | 2 Hours | 160 | 4H | 6-6 | 16 |
| Heloxy ™ 68 (5%) | 20% | None | 0.5 Hour | 160 | 5H | 5-6 | 18 |
| " | " | 0.1% NH$_4$HCO$_3$ | 2 Hours | 100 | 5H | 5-5 | 18 |
| " | " | B 958 (2%) | 2 Hours | N.m. | N.m. | N.m. | 20 |
| " | " | 0.1% NH$_4$HCO$_3$ | 2 Hours | N.m. | N.m. | N.m. | 19 |
| Epon ™ 872 (10%)[2] | 20% | 0.1% NH$_4$HCO$_3$ | 0.5 Hour | 160 | 4H | 3-3 | 23 |
| Epon ™ 872 (10%)[1] | " | B 958 (2%) | 0.5 Hour | 60 | 3H | 4-4, 6s | 14 |
| Epon ™ 872 (10%) | " | 0.1% NH$_4$HCO$_3$ | 0.5 Hour | 160 | 4H | 4-4 | 16 |
| " | " | B 958 (2%) | 0.5 Hour | 60 | 4H | 2-3 | 13 |
| GT 7099 (10%) | 20% | None | 0.5 Hour | 40 | 5H | 3-4, 8s | 14 |

TABLE 6-continued

| Modifier and Concentration | CoCA | Reagent in Postrinse if Any | Initial Brake Fluid Resistance | Values After Heat Treating 65 Hours at 177° C. | | | Results after Scribe/Scab 20 Cycles |
|---|---|---|---|---|---|---|---|
| | | | | Reverse Impact | Pencil Hardness after 6 Hours in Brake Fluid | Results after 500 Hours Salt Spray | |
| GT 7099 (10%) | " | B 958 (2%) | 0.5 Hour | 160 Bk Crk | 6H | 3-3 | 10 |
| RP 6565 (10%) | 20% | 0.1% NH$_4$HCO$_3$ | 0.5 Hour | 160 | 4H | 4-5 | 16 |
| " | " | B 958 (2%) | 0.5 Hour | 120 | H | 4-5 | 15 |
| Heloxy ™ 107 (5%) | 20% | 0.1% NH$_4$HCO$_3$ | 2 Hours | 160 | 3H | 6-7, 14s | 16 |
| " | " | B 958 (2%) | 0.5 Hour | 160 | H | 7-7 | 16 |
| Lumiflon ™ 400 (10%) | 20% | 0.1% NH$_4$HCO$_3$ | 2 Hour | 140 | 7H | 4-4 | 36 |
| " | " | B 958 (2%) | 2 Hour | 20 | 5H | 4-5 | 36; 30% Peel |
| None[3] | 20% | None | ~4 Hours | 60 Dark | 4H | 8-8, 24s | 14 |
| " | " | 0.1% NH$_4$HCO$_3$ | 2 Hours | 160 | 7H | 4-4, 10s | 18 |
| " | " | B 958 (2%) | ~0.5 Hour | 60 | 2H | 4-5 | 8 |
| None | 20% | B 958 (2%) | <0.5 Hour | 160 | 4B | 30% Peel | 33 |
| | | | Part B: With EPON ™ 1004 | | | | |
| Epon ™ 828 (10%)[1] | 20% | None | <0.5 Hour | 120 | 6H | 3-5 (1) Blist. | 9 Ave. (4 & 13) |
| " | " | B 958 (2%) | <0.5 Hour | 160 | N.m. | 1-2 (1) | 11 (1) |
| " | " | None | <0.5 Hour | N.m. | N.m. | N.m. | 14 (1) |
| Epon ™ 872 (10%)[1] | " | None | <0.5 Hour | N.m. | N.m. | N.m. | 16 |
| " | " | 0.1% NH$_4$HCO$_3$ | <0.5 Hour | 160 | 4H | 2-2 | 15 |
| Epon ™ 1031 (10%)[1] | " | None | 2 Hours | 80 | 7H | 60% Peel | 12 |
| " | " | 0.1% NH$_4$HCO$_3$ | <0.5 Hour | 160 | 6H | 3-5 | N.m. |
| XP 71739 (10%)[1] | " | None | <0.5 Hour | N.m. | N.m. | N.m. | 13 |
| " | " | 0.1% NH$_4$HCO$_3$ | 0.5 Hour | N.m. | N.m. | 2-3 | N.m. |
| XP 71739 (10%) | " | None | <0.5 Hour | N.m. | N.m. | N.m. | 12 |
| XP 71739 (10%) | " | None | <0.5 Hour | N.m. | N.m. | N.m. | 12 |
| XP 71739 (10%)[2] | " | 0.1% NH$_4$HCO$_3$ | N.m. | 55 | 5H | 2-2 | 10 |

Footnotes for Table 6
[1]For this example, the cure was 20 minutes at 140° C. followed by 40 minutes at 190° C. [2]The cross-linking agent for this example was B 1530 only.
[3]For this example, the cure was 20 minutes at 160° C. followed by 40 minutes at 190° C.
Abbreviations and Other Notes for Table 6
CoCA = Concentration of Coalescing Agent; B 958 = BONDERITE ® 958 Replenisher, commercially available from the Parker Amchem Div. of Henkel Corp., Madison Heights, Michigan, USA; this material is an aqueous solution normally intended for preparation of zinc phosphate conversion coating baths and contains zinc, manganese, and nickel cations and phosphate and complex fluoride anions along with phosphoric acid; Blist. = Blistering observed.

Table. Particle size data in some of the dispersions prepared as described in Table 6 are shown in Table 7.

TABLE 7

| Epoxy | Modifier | Particle Size in Micrometres Measured in the: | | | |
|---|---|---|---|---|---|
| | | Dispersion without Coalescing Agent | Dispersion with Dowanol ™ PnB Cls. Ag. | Initial Autodepositing Liquid Composition | Worked Autodepositing Liquid Composition |
| Epon ™ 1007 | None | 0.21(0.17) | 0.24(0.21) | N.m. | 0.93 |
| Epon ™ 1007 | Epon ™ 828 | 0.18(0.15) | 0.20(0.16) | 0.25 | N.m. |
| Epon ™ 1007 | Epon ™ 872 | 0.25 | 0.23 | N.m. | N.m. |
| Epon ™ 1007 | Heloxy ™ Modifier 68 | 0.13 & 0.26 | 0.18 | N.m. | 0.97 |
| Epon ™ 1007 | Heloxy ™ Modifier 107 | 0.17 | N.m. | 0.17 | N.m. |
| Epon ™ 1007 | Kraton ™ | 0.17 | 0.11 & 0.22 | N.m. | N.m. |
| Epon ™ 1007 | 1120-A-80 | 0.16 | 0.19 | 0.15 | N.m. |
| Epon ™ 1007 | XP 71739 | 017 | 0.19 | 0.24 | 0.28 |
| Epon ™ 1004 | None | 0.14 | 0.13 | 0.12 | N.m. |
| Epon ™ 1004 | Epon ™ 828 | 0.13 | 0.16 | 0.15 | 0.87 |
| Epon ™ 1004 | Epon ™ 872 | 0.14 | N.m. | N.m. | N.m. |
| Epon ™ 1004 | XP 71739 | 0.12 | 0.13 | 0.11 | N.m. |

Notes for Table 7
Cls. Ag.= Coalescing Agent; more than one entry in a cell, with either an ampersand or parentheses, indicates that both values were obtained on different attempts at replication of the composition. The values shown are for the most prominent peak in the calculated particle size distribution.

Low crosslinker level (4%) was also screened with the unmodified Epon™ 1007/B 1530/BL 3175A coating. Using B 958 rinse, the brake fluid resistance was <0.5 hours, as compared to 2 hours with the higher crosslinker level (18%) using the same rinse.

Composition Group II

Based on the results obtained in Group I as described above, a statistical Box-Behnken design was used to optimize coalescing agent (which may alternatively be called "coalescent" for brevity) and concentrations of coalescing agent and modifier, with the following constants:

Epoxy Resin: Epon™ 1007F Modifier Resin: Epon 828
Crosslinker: Vestagon™ B 1530 Emulsifying Agent: 2.7% Rhodapex™ CO 436
Film Build: 20.3–25.4 micrometres Post Autodeposition Rinse: 2% Bonderite® 958
Cure: 20 minutes at 150° C. followed by 40 minutes at 185° C. for Dowanol™ PnB
20 minutes at 125° C. followed by 40 minutes at 185° C. for Dowanol™ PPh.
The details of the design are shown in Table II-1 below, and results, including results from some additional examples not part of the Box-Behnken design, are shown in Tables II-2 and II-3 below.

Group III—Mixing and Dispersion Variation Examples

The variables for this study were resin molecular weight (Epon™ 1007, Epon™ 1004, Epon™ 828), presence or absence of Foamaster™ 111, polymer solution concentration, and dispersing equipment (Microfluidizer™, Cowles disperser, Kady disperser, IKA in-line disperser and laboratory mixer, and APV homogenizer). The key observables were particle size, particle size distribution, and dispersion stability.

The microemulsions which are characterized below as "with Cowles blade" were made by a procedure which is typically called inversion emulsion. A polymer solution in organic solvent, the solvent generally being a mixture of equal masses of toluene and methyl isobutyl ketone (hereinafter usually abbreviated "MIBK"), was poured into a container that also was provided with a Cowles blade. After this blade was brought to a moderately high speed, the desired amounts of surfactant and of DI water were added. The blade was then brought up to its highest speed and allowed to operate for 5 to 20 minutes. Finally, more DI water, about three to six times as much as the first addition of DI water, was added and the blade was then shut off after a few minutes. The result was an emulsion, typically with mean particle size on the order of 700 to 1200 nm.

Microemulsions characterized below as made with a MICROFLUIDIZER™ apparatus were made in the same manner as already described above for making the emulsions for Groups I and II except that (i) in some instances, as noted in tables below, a preliminary emulsion made with a Cowles blade or a Kady mill was used instead of the initial stage of using the injection system of the MICROFLUIDIZER™ apparatus as described above and (ii) the particle size was measured after each pass through the MICROFLUIDIZER™ apparatus instead of using a fixed number of passes as described

TABLE II-1

| Trial # | Coalescent | Coalescent Concentration, % | Epoxy/Cross-Linking Agent Ratio | Modifier Concentration, % |
|---|---|---|---|---|
| 1[1] | Dowanol ™ PPh | 7.5 | 90:10 | 15 |
| 2 | Dowanol ™ PnB | 10 | 80:20 | 10 |
| 3 | Dowanol ™ PPh | 0 | 80:20 | 15 |
| 4 | Dowanol ™ PnB | 10 | 95:5 | 10 |
| 5 | Dowanol ™ PnB | 20 | 90:10 | 20 |
| 6 | Dowanol ™ PnB | 20 | 80:20 | 15 |
| 7 | Dowanol ™ PPh | 7.5 | 80:20 | 10 |
| 8 | Dowanol ™ PPh | 0 | 90:10 | 20 |
| 9 | Dowanol ™ PnB | 10 | 95:5 | 20 |
| 10 | Dowanol ™ PnB | 10 | 80:20 | 20 |
| 11 | Dowanol ™ PPh | 0 | 95:5 | 15 |
| 12 | Dowanol ™ PPh | 7.5 | 95:5 | 10 |
| 13 | Dowanol ™ PPh | 0 | 90:10 | 10 |
| 14 | Dowanol ™ PnB | 20 | 80:20 | 15 |
| 15 | Dowanol ™ PnB | 20 | 90:10 | 10 |
| 16[1] | Dowanol ™ PPh | 7.5 | 90:10 | 15 |
| 17 | Dowanol ™ PPh | 15 | 90:10 | 10 |
| 18 | Dowanol ™ PPh | 15 | 95:5 | 15 |
| 19 | Dowanol ™ PPh | 15 | 90:10 | 20 |
| 20 | Dowanol ™ PPh | 7.5 | 95:5 | 20 |
| 21 | Dowanol ™ PPh | 15 | 80:20 | 15 |
| 22 | Dowanol ™ PnB | 10 | 90:10 | 15 |
| 23 | Dowanol ™ PPh | 7.5 | 80:20 | 20 |
| 24[1] | Dowanol ™ PPh | 7.5 | 90:10 | 15 |

Footnote for Table II-1
[1]This is the center point of the Box-Behnken design.

TABLE II-2

| Identifying Number | Ratio of Epon™ 828/ Epon™ 1007F | Ratio of Total Epoxy/ Cross-Linker | Coalescent and Percent Thereof if Any | Most Frequent Particle Size, micrometers, in: Dispersion Before Adding Coalescent | Most Frequent Particle Size, micrometers, in: Dispersion After Adding Coalescent | Most Frequent Particle Size, micrometers, in: Initial Autodepositing Liquid Composition | Most Frequent Particle Size, micrometers, in: Worked Autodepositing Liquid Composition | Stability of: Dispersion After Adding Coalescent at 23 ± 5° C. | Stability of: Dispersion After Adding Coalescent at 49 ± 1° C. | Stability of: Initial Autodepositing Liquid Composition at 23 ± 5° C. | Stability of: Initial Autodepositing Liquid Composition at 49 ± 1° C. | Stability of: Worked Autodepositing Liquid Composition at 23 ± 5° C. | Stability of: Worked Autodepositing Liquid Composition at 49 ± 1° C. |
|---|---|---|---|---|---|---|---|---|---|---|---|---|---|
| 1 | 15:85 | 90:10 | PPh 7.5 | — | 0.18 | 0.19 | 0.22 | >1 Mo. | >1 Mo. | >1 Mo. | >1 Mo. | >1 Mo. | >1 Mo. |
| 2 | 10:90 | 80:20 | PnB 10 | 0.19 | 0.17 | 0.18 | 0.20 | >1 Mo. | >1 Mo. | >1 Mo. | >1 Mo. | Res. 1 Mo. | >1 Mo. |
| 3 | 15:85 | 80:20 | None | 0.19 | — | 0.18 | 0.22 | >1 Mo. | >1 Mo. | >1 Mo. | >1 Mo. | >1 Mo. | >1 Mo. |
| 4 | 10:90 | 95:5 | PnB 10 | 0.18 | 0.18 | 0.18 | 0.18 | >1 Mo. | >1 Mo. | >1 Mo. | >1 Mo. | >1 Mo. | >1 Mo. |
| 5 | 20:80 | 90:10 | PnB 20 | 0.16 | 0.18 | N.m. | 0.17 | >1 Mo. | >1 Mo. | Res. 2 Wks. | N.m. | N.m. | >1 Mo. |
| 6 | 15:85 | 80:20 | PnB 20 | 0.17 | 0.16 | 0.19 | 0.25 | >1 Mo. | >1 Mo. | >1 Mo. | >1 Mo. | N.m. | >1 Mo. |
| 7 | 10:90 | 80:20 | PPh 7.5 | — | 0.17 | 0.29 | >0.5 | N.m. | N.m. | >1 Mo. | N.m. | >1 Mo. | Nm |
| 8 | 20:80 | 90:10 | None | 0.18 | — | 0.22 | 0.21 | >1 Mo. | >1 Mo. | Res.2 Wks. | >1 Mo. | N.m. | >1 Mo. |

TABLE II-2-continued

| | | | | | Most Frequent Particle Size, micrometers, in: | | Stability of: | | | | | |
|---|---|---|---|---|---|---|---|---|---|---|---|---|
| | Ratio of | Ratio of | Coa- lescent | Disper- sion Be- | Disper- sion | Initial Autode- | Worked Autode- | | | | | Worked |
| Ident- ifying | Epon™ 828/ | Total Epoxy/ | and Percent | fore Adding | After Adding | positing Liquid | positing Liquid | Dispersion After Add- ing Coalescent | | Initial Autodepositing Liquid Composition | | Autodepositing Liquid Composition | |
| Num- ber | Epon™ 1007F | Cross- Linker | Thereof if Any | Coales- cent | Coales- cent | Composi- tion | Composi- tion | at 23 ± 5° C. | at 49 ± 1° C. | at 23 ± 5° C. | at 49 ± 1° C. | at 23 ± 5° C. | at 49 ± 1° C. |
| 9 | 20:80 | 95:5 | PnB 10 | 0.23 | 0.16 | 0.21 | 0.23 | >1 Mo. | N.m. | >1 Mo. | Res. 1 Wk. | >1 Mo. | Res. 1 Wk. |
| 10 | 20:80 | 80:20 | PnB 10 | 0.17 | 0.18 | 0.16 | 0.20 | >1 Mo. | >1 Mo. | >1 Mo. | >1 Mo. | >1 Mo. | Res. 2 Wks. |
| 11 | 15:85 | 95:5 | None | 0.16 | — | 0.26 | 0.28 | N.m. | N.m. | >1 Mo. | >1 Mo. | >1 Mo. | >1 Mo |
| 12 | 10:90 | 95:5 | PPh 7.5 | — | 0.19 | 0.21 | 0.26 | >1 Mo. | >1 Mo. | >1 Mo. | >1 Mo. | >1 Mo. | >1 Mo |
| 13 | 10:90 | 90:10 | None | 0.18 | — | 0.20 | >0.5 | N.m. | N.m. | >1 Mo. | >1 Mo. | >1 Mo. | Res. 1 Mo |
| 14 | 15:85 | 80:20 | PnB 20 | 0.17 | 0.20 | 0.17 | 0.18 | N.m. | N.m. | >1 Mo. | >1 Mo. | >1 Mo. | Res. 1 Mo |
| 15 | 10:90 | 90:10 | PnB 20 | 0.17 | 0.17 | 0.18 | >0.5 | N.m. | N.m. | >1 Mo. | >1 Mo. | >1 Mo. | Res. 2 Wks. |
| 16 | 15:85 | 90:10 | PPh 7.5 | — | N.m. | 0.18 | 0.17 | N.m. | N.m. | >1 Mo. | >1 Mo. | >1 Mo. | Res. 2 Wks. |
| 17 | 10:90 | 90:10 | PPh 15 | — | 0.20 | 0.19 | 0.20 | N.m. | >1 Mo. | >1 Mo. | Res. 1 Mo. | >1 Mo. | Res. 2 Wks. |
| 18 | 15:85 | 95:5 | PPh 15 | — | 0.19 | 0.20 | >0.5 | N.m. | N.m. | >1 Mo. | N.m. | >1 Mo. | N.m. |
| 19 | 20:80 | 90:10 | PPh 15 | — | 0.19 | 0.26 | N.m. | >1 Mo. | >1 Mo. | >1 Mo. | Res. 1 Mo. | N.m. | Res. Mo. |
| 20 | 20:80 | 95:5 | PPh 7.5 | — | 0.17 | 0.23 | >0.5 | N.m. | N.m. | >1 Mo. | >1 Mo. | >1 Mo. | Res. 1 Mo. |
| 21 | 15:85 | 80:20 | PPh 15 | — | 0.17 | 0.15 | N.m. | N.m. | >1 Mo. | >1 Mo. | Res. 1 Wk. | >1 Mo. | >1 Mo. |
| 22 | 15:85 | 90:10 | PnB 10 | 0.17 | 0.19 | 0.20 | 0.21 | >1 Mo. | N.m. | >1 Mo. | N.m. | >1 Mo. | N.m. |
| 23 | 20:80 | 80:20 | PPb 7.5 | — | 0.15 | N.m. | 0.15 | >1 Mo. | >1 Mo. | N.m. | N.m. | >1 Mo. | >1 Mo |
| 24 | 15:85 | 90:10 | PPh 7.5 | — | 0.18 | 0.20 | 0.18 | >1 Mo. | N.m. | >1 Mo. | >1 Mo. | >1 Mo. | >1 Mo. |
| 25[1] | 10:85:5 | 80:20 | PnB 10 | 0.16 | 0.16 | >0.5 | >0.5 | >1 Mo. | N.m. | >1 Mo. | N.m. | N.m. | N.m. |
| 26[1] | 10:85:5 | 80:20 | None | 0.14 | — | 0.17 | >0.5 | >1 Mo. | Res. 3 Wks. | >1 Mo. | >1 Mo. | >1 Mo. | >1 Mo. |
| 27[1] | 10:85:5 | 80:20 | PPh 5 | — | 0.15 | N.m. | >0.5 | N.m. | N.m. | N.m. | N.m. | N.m. | N.m. |
| 28 | 15:85 | 90:10 | None | 0.18 | — | 0.15 | 0.28 | >1 Mo. | >1 Mo. | >1 Mo. | >1 Mo. | >1 Mo. | >1 Mo. |

Footnote for Table II-2
[1]The third epoxy resin was XP 71739.
Other Notes for Table II-2
PnB and PPh are the Dowanol™ solvents identified by the same abbreviations in earlier tables. "Mo." "Month(s)"; "Wk(s)." = "Week(s)"; "Res." = "Residue was visible after".

TABLE II-3

| Identifying Number | Ratio of Epon™ 828/ Epon™ 1007F | Ratio of Total Epoxy/Cross- Linker | Coalescent and Percent Thereof if Any | Pencil Hardness | Reverse Impact Value | Brake Fluid Resistance | Number of Panels Processed | Results after 500 Hours Salt Spray Test (Film Thickness, μ) | Scribe/Scab, 20 Cycles (Film Thickness, μ) |
|---|---|---|---|---|---|---|---|---|---|
| 1 | 15:85 | 90:10 | PPh 7.5 | 4H | 160 | <0.5 Hour | 18 | 1-1 (23) | 12(28); 19(17) |
| 2 | 10:90 | 80:20 | PnB 10 | 3H | 160 | >4 Hours | 2 | 1-2,4s (22) | 18 (17) |
| 3 | 15:85 | 80:20 | None | 4H | 160 | >4 Hours | 6 | 1-1 (25) | 20 (27) |
| 4 | 10:90 | 95:5 | PnB 10 | 3H | 160 | <0.5 Hour | 14 | 3-4 (24) | 14.5(24) |
| 5 | 20:80 | 90:10 | PnB 20 | 4H | 160 | >4 Hours | 6 | 0-1 (22) | 12 (20) |
| 6 | 15:85 | 80:20 | PnB 20 | 4H | 160 | <0.5 Hour | 24 | 2-4 (23) | 17 (23) |
| 7 | 10:90 | 80:20 | PPh 7.5 | 5H | 160 | N.m. | 6 | 1-3 (25) | 20.5 (21) |
| 8 | 20:80 | 90:10 | None | 4H | 160 | <0.5 Hour | 8 | 0-1 (24) | 16.5 (23) |
| 9 | 20:80 | 95:5 | PnB 10 | 5H | 160 | <0.5 Hour | 12 | 90%P (19) | 85%P (12) |
| 10 | 20:80 | 80:20 | PnB 10 | 4H | 160 | 1 Hour | 22 | 1-2 (22) | 24.5 (22) |
| 11 | 15:85 | 95:5 | None | 4H | 160 | <0.5 Hour | 4 | 0-1 (24) | 21 (22) |
| 12 | 10:90 | 95:5 | PPh 7.5 | 3H | 160 | <0.5 Hour | 6 | 4-5,7s (24) | 14 (23) |
| 13 | 10:90 | 90:10 | None | 4H | 160 | <0.5 Hour | 8 | 1-1 (25) | 16 (25) |
| 14 | 15:85 | 80:20 | PnB 20 | 4H | 160 | <0.5 Hour | 0 | 7-7 (23) | 17 (23) |
| 15 | 10:90 | 90:10 | PnB 20 | 3H | 160 | <0.5 Hour | 12 | 1-9, 5%P (21) | 27 (20) |
| 16 | 15:85 | 90:10 | PPh 7.5 | 2H | 160 | <0.5 Hour | 18 | 1-1 (25) | 17 (26) |
| 17 | 10:90 | 90:10 | PPh 15 | 4H | 160 | <0.5 Hour | 8 | 0-2 (25) | 15(24) |
| 18 | 15:85 | 95:5 | PPh 15 | 4H | 160 | <0.5 Hour | 22 | 7-8 8%P (12) | 28(12) |
| 20 | 20:80 | 95:5 | PPh 7.5 | 2H | 160 | <0.5 Hour | 6 | 0-1 (25) | 14.5 (23) |
| 21 | 15:85 | 80:20 | PPh 15 | 4H | 160 | <0.5 Hour | 10 | 1-2,3s (22) | 24.5 (24) |
| 24 | 15:85 | 90:10 | PPh 7.5 | 4H | 160 | 0.5 Hour | 32 | 1-3 (N.m.) | 30 (NA) |
| 25[1] | 10:85:5 | 80:20 | PnB 10 | N.m. | N.m. | N.m. | N.m. | N.m. | 26 (NA) |

TABLE II-3-continued

| Identifying Number | Ratio of Epon ™ 828/ Epon ™ 1007F | Ratio of Total Epoxy/Cross-Linker | Coalescent and Percent Thereof if Any | Pencil Hardness | Reverse Impact Value | Brake Fluid Resistance | Number of Panels Processed | Results after 500 Hours Salt Spray Test (Film Thickness, $\mu$) | Scribe/Scab, 20 Cycles (Film Thickness, $\mu$) |
|---|---|---|---|---|---|---|---|---|---|
| 27[1] | 10:85:5 | 80:20 | PPh 5 | N.m. | N.m. | N.m. | N.m. | N.m. | 25 (22); (1) 60%P |
| 28 | 15:85 | 90:10 | None | 4H | 160 | <0.5 Hour | 10 | 2-3,4s (28) | 19 (25) |

Footnote for Table II-3
[1]The third epoxy resin was XP 71739.

above. Resulting particle size statistics are shown in Table III-1 below.

Microemulsions characterized below as made with a Kady mill were prepared in a Kady Model L mill. In a typical experiment, 250 parts in total of epoxy resin(s) and any cross-inking agents and/or modifiers used were dissolved in 150 parts of toluene and 150 parts of MIBK. This solution was transferred to a stainless steel mixing vessel equipped with a cooling jacket and the milling means characteristic of the equipment from this manufacturer, which was initially operated at 8,000 rpm. To this solution, a separate solution of 11.4 parts of Rhodapex™ CO-436 emulsifying agent dissolved in 50 parts of DI water was added, and the mixer was then turned up to its full speed of 16,000 rpm. It was then allowed to stir for 5 min. Another 100 parts of DI water was then added. At this point the viscosity of the emulsion usually became similar to that of whipped cream, indicating that the mixture was at the point of inversion from water-in-oil to oil-in-water. Additional DI water was added slowly until the viscosity dropped to the point that the emulsion readily flowed through the Kady blade. The mill was then allowed to run for one additional hour.

Results with the Kady mill varied considerably, depending on which of two stator designs supplied with the machine were used. The "original" stator supplied was reported by the supplier to be the current standard design. A "new" stator also supplied was reported to be engineered to increase the efficiency of collisions of the particles and did in fact produce substantially smaller particle sizes; results are summarized in Table III-2.

Two types of preliminary emulsions were subjected to particle refinement in a homogenizer: The first sample was an emulsion produced by using a Cowles blade as described above. The second sample was produced by a Kady mill with original stator and had a maximum particle size of 400 nm. These preliminary emulsions were gravity fed into a Rannie™ Model 12.51 H or Model 8.30 homogenizer respectively, each with a single stage homogenizing valve. Samples were taken at several pressures up to 14,500 psi. The maximum temperature of the samples was noted as 63° C. Results are summarized in Table III-3.

A sample preliminary emulsion prepared with a Cowles blade (identically to the first sample tested in a Rannie™ homogenizer as described above) was run through an IKA DR# 6/6 P in-line milling unit. The generator configuration was designated as super fine, super fine, super fine. Samples were run continuously for 5 minutes and separately

TABLE III-1

| | | | Particle Diameters in nm | |
|---|---|---|---|---|
| Epon ™ Resin Used | Cowles Blade? | No. of Passes | Effective | Mean |
| 1004 | with | 1 | 239.3 | 232 |
| 1004 | with | 2 | 215.8 | 199 |
| 1004 | with | 3 | 197.2 | 190 |
| 1004 | with | 4 | 184.9 | 157 |
| 1004 | with | 5 | 182.1 | 173 |
| 1004 | with | 6 | 180.8 | 170 |
| 1004 | without | 1 | 251.8 | 239 |
| 1004 | without | 2 | 174.7 | 168 |
| 1004 | without | 3 | 157.3 | 145 |
| 1004 | without | 4 | 144.8 | 132 |
| 1004 | without | 5 | 143.8 | 140 |
| 1004 | without | 6 | 141.2 | 129 |
| 1004 | with[1] | 0 | 384 | 250 |
| 1004 | with[1] | 1 | 241.9 | 243 |
| 1004[2] | without | 6 | 159.9 | 159 |
| 1007 | without | 1 | 319 | 261 |
| 1007 | without | 2 | 227.9 | 214 |
| 1007 | without | 3 | 213.4 | 200 |
| 1007 | without | 4 | 212.9 | 203 |
| 1007 | without | 5 | 211.5 | 211 |
| 1007 | without | 6 | 205.0 | 201 |
| 1007 | with | 1 | 311.8 | 312 |
| 1007 | with | 2 | 269.3 | 225 |
| 1007 | with | 3 | 247.7 | 242 |
| 1007 | with | 4 | 224.9 | 196 |
| 1007 | with | 5 | 232.2 | 219 |

Footnotes for Table III-1
[1]This was first dispersed with Kady mill before being passed through the MICROFLUIDIZER ™ apparatus.
[2]Foamaster ™ 111 defoamer in an amount of about 0.5 grams of defoamer per kilogram of total composition was also added to this mixture, along with the other ingredients generally noted above.

TABLE III-2

| Conditions | Particle Size |
|---|---|
| 250 g solids, 200 g of water, original stator | 387 nm |
| 400 g solids, 30 g water, original stator | 585 nm |
| 250 g solids, 250 g of water, original stator | 328 nm |
| 250 g solids, 300 g of water, original stator | 321 nm |
| 400 g solids, 50 g water, original stator | 343 nm |
| 250 g solids, 200 g of water, new stator | 212 nm |
| 250 g solids, 200 g of water, new stator[1] | 316 nm |
| 250 g solids, 200 g of water, original stator[2] | 200 nm |

Footnotes for Table III-2
[1]This emulsion was milled for only 30 minutes after the last addition of water, instead of 60 minutes as for the other emulsions.
[2]This emulsion was passed once through the MICROFLUIDIZER ™ apparatus after completion of the normal Kady milling procedure.

for 1 to 3 passes through the milling unit. Other samples were passed through an IKA laboratory disperser/mixer, in the same manner, except for the change of equipment, as described above for the Kady disperser. Results are shown in Table III-4 below.

All the procedures, or combinations of procedures, described above within this group which resulted in an average particle size not more than 220 nm were further evaluated for stability in a working autodepositing liquid composition. The epoxy resin dispersions were used either as the sole constituent of component (A) as described above or in a mixture with an equal part by weight, counting only solids in each case, of a conventional emulsion polymerized latex dispersion of acrylic polymer, as known generally in the art to have been suitable for autodepositing liquid compositions heretofore. The remaining constituents (B) and (C), along with (G) and/or (J) when used, as described above for Example Group II were then combined to make an autodepositing liquid composition as described for Example Group II. The autodepositing liquid compositions all appeared stable for the first day after being made and were allowed to sit without agitation for an extended period of time. At selected intervals each sitting autodepositing liquid composition was transferred to another container, and the bottom of the container

TABLE III-3

| Pressure, Bars | Number of Passes | Effective Particle Size |
|---|---|---|
| For Preliminary Emulsion Made with Cowles Blade | | |
| — | 0 | >>1000 nm |
| 344 | 1 | 418.7 nm |
| 551 | 1 | 374.7 nm |
| 689 | 1 | 338.8 nm |
| 827 | 1 | 327.8 nm |
| 999 | 1 | 302.9 nm |
| 827 | 2 | 217.6 nm |
| 999 | 2 | 203.7 nm |
| For Preliminary Emulsion Made with Kady Mill | | |
| — | 0 | 350.0 nm |
| 1033 | 1 | 185.9 nm |
| 1033 | 2 | 189.4 nm |
| 1033 | 3 | 153.7 nm |
| 1033 | 4 | 164.1 nm |
| 1033 | 5 | 158.0 nm |
| 1033 | 6 | 157.2 nm |
| 1033 | 7 | 148.7 nm |
| 1378 | 7 | 164.9 nm | which had contained the autodepositing liquid composition while it was sitting was checked, visually, for any settling of dispersion. This would represent the first signs of emulsion instability. The results are summarized in Table III-5.

TABLE III-4

| Conditions | Effective Particle Size |
|---|---|
| Before any milling | 1247 nm |
| Large batch, 1 pass | 802 nm |
| Small batch, first pass | 675 nm |
| Small batch, second pass | 787 nm |
| Small batch, third pass | 929 nm |
| Small batch, 5 minutes continuous feed | 793 nm |
| Laboratory mill | 455 nm |

TABLE III-5

| Component (A) Composition | Process | Average Particle Size | Stability after 3 Days | Stability after 11 Days |
|---|---|---|---|---|
| 50/50 Ac/Ep | Kady milled only | 212 nm | Some settling | Significant settling |
| 50/50 Ac/Ep | Kady mill + 1 Microfluidizer ™ pass | 200 nm | Very little settling | Very little settling |
| 50/50 Ac/Ep | Cowles Blade + 2 homogenizer passes | 200 nm | Very little settling | Very little settling |
| 100 Ep | Kady milled only | 212 nm | N.m. | Significant settling |
| 100 Ep | Kady mill + 1 Microfluidizer ™ pass | 200 nm | N.m. | Very little settling |
| 100 Ep | Cowles Blade + 2 homogenizer passes | 200 nm | N.m. | Very little settling |

Abbreviations for Table III-5
"50/50 Ac/Ep" means a blend of equal masses of epoxy resin and acrylic latex solids as described in the main test.
"100 Ep" means all epoxy resin.

The invention claimed is:

1. An autodepositing liquid composition comprising water and:
   (A) at least about 1.0%, based on the composition, of dispersed or both dispersed and dissolved film forming polymer molecules, said amount including at least about 0.2%, based on the composition, of dispersed molecules each containing at least two 1,2-epoxy moieties, the total amount of all of said dispersed or dissolved and dispersed film forming polymer molecules having the following size distribution characteristics in a dispersion, or dispersion and solution, (the phrase "dispersion, or dispersion and solution" being hereinafter abbreviated as "DDS"):
      (1) the DDS has a mean light scattering particle size that is at least about 100 but not more than about 300 nm;
      (2) no more than about 1.0% of the light scattering particles volume in the DDS consists of particles with a diameter larger than about 450 nm;
      (3) no more than about 25% of the light scattering particles volume in the DDS consists of particles with a diameter larger than about 250 nm;
      (4) no more than about 50% of the light scattering particles volume in the DDS consists of particles with a diameter larger than about 200 nm; and
      (5) no more than about 75% of the light scattering particles volume in the DDS consists of particles with a diameter larger than about 175 nm;
   (B) an emulsifying agent component in sufficient quantity to emulsify any insoluble part of component (A) so that, in the autodepositing liquid composition, no separation or segregation of bulk phases that is perceptible with normal unaided human vision occurs during storage at 25° C. for at least 24 hours after preparation of the autodepositing liquid composition, in the absence of contact of the autodepositing liquid composition with any substance that reacts with the autodepositing liquid composition; and
   (C) a dissolved accelerator component, selected from the group consisting of acids, oxidizing agents, and complexing agents, sufficient in strength and amount to impart to the autodepositing liquid composition an oxidation-reduction potential that is at least 100 mV more oxidizing than a standard hydrogen electrode.

2. An autodepositing liquid composition according to claim 1, wherein: component (A) is present in an amount of from about 2.5 to about 10% of the composition; at least about 20% of all molecules of component (A) contain at least two 1,2-epoxide moieties per molecule and have an epoxide equivalent weight of at least about 374; at least about 20% of the molecules in component (A) that contain at least two 1,2-epoxide moieties and have an epoxide equivalent weight of at least about 374 have an equivalent weight that is at least about 446 but is not more than about 4527; if the composition includes any molecules having at least two 1,2-epoxide moieties and an epoxide equivalent weight of at least 873, the composition also includes an amount of molecules having exactly two 1,2-epoxide moieties and an epoxide equivalent weight not more than about 200 that is at least 4% of the amount of molecules having at least two 1,2-epoxide moieties and an epoxide equivalent weight of at least 873.

3. A autodepositing liquid composition according to claim 2, also comprising cross-linking agents selected from the group consisting of:

(CL. 1) molecules each containing at least two functional groups, which may be the same or different, selected from the group consisting of amine, amide, imine, thiol, hydroxyl, carboxyl, and carboxylic acid anhydride; and (CL.2) molecules that contain at least two blocked isocyanate groups, where the blocked isocyanate groups do not react at room temperature with hydroxyl groups but do react after being unblocked by heating to a temperature that is at least 100° C. and is not more than 190° C.

4. An autodepositing liquid composition according to claim 3, wherein: component (A) comprises from about 3.5 to about 6.5% of the total composition; at least about 40% of all molecules of component (A) contains at least two 1,2-epoxide moieties per molecule and have an epoxide equivalent weight of at least about 374; at least about 80% of the molecules in component (A) that contain at least two 1,2-epoxide moieties and have an epoxide equivalent weight of at least about 374 have an equivalent weight that is at least about 1868 but is not more than about 2295; if the composition includes any molecules having at least two 1,2-epoxide moieties and an epoxide equivalent weight of at least 873, the composition also includes an amount of molecules having exactly two 1,2-epoxide moieties and an epoxide equivalent weight not more than about 200 that is at least 9% of the amount of molecules having at least two 1,2-epoxide moieties and an epoxide equivalent weight of at least 873; if at least 90% of component (A) comprises molecules having at least two 1,2-epoxide moieties, the amount of molecules having exactly two 1,2-epoxide moieties and an epoxide covalent weight not more than about 200 is not more than 25% of the amount of molecules having at least two 1,2-epoxide moieties and an epoxide equivalent weight of at least 873; and, for the amount of component (A) comprises molecules for which the epoxide equivalent weight is at least 374: the ratio of the mean light scattering particle diameter in nm divided by the cube root of the average epoxide equivalent weight expressed in daltons, this ratio being denoted hereinafter as the "diameter ratio", is not more than about 23.0 $\{nm/(dalton^{1/3})\}$; no more than about 1.0% of the light scattering particles volume consists of particles with a diameter ratio larger than about 36.0; no more than about 25% of the light scattering particles volume consists of particles with a diameter ratio larger than about 21.0 $\{nm/(dalton^{1/3})\}$; no more than about 50% of the light scattering particles volume consists of particles with a diameter ratio larger than about 18.0 $\{nm/(dalton^{1/3})\}$; and no more than about 75% of the light scattering particles volume consists of particles with a diameter ratio larger than about 15.0 $\{nm/(dalton^{1/3})\}$.

5. An autodepositing liquid composition according to claim 4, wherein the molecules of component (A) that have at least two 1,2-epoxide moieties conform to general chemical formula (I):

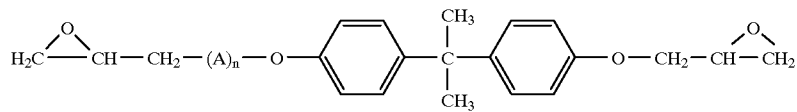

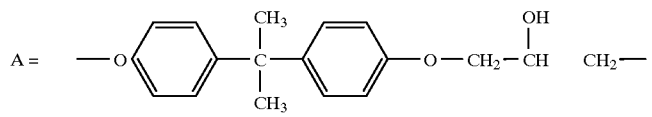

and n is an integer from 0 to 50.

6. A process for making an autodepositing liquid composition according to claim 5, said process comprising steps of:

(I) providing a collection of film forming polymer molecules to constitute component (A) of the autodepositing liquid composition:

(II) dissolving the collection of film forming polymer molecules provided in step (I) in a solvent component to form a single phase solution comprising the collection of film forming polymer molecules and the solvent component;

(III) emulsifying the single phase solution formed in step (II), optionally along with other materials, into water, so as to form a DDS in water of at least those parts of the single phase solution formed in step (II) that constitute component (A) of the autodepositing liquid composition according to claim 5, thereby forming a DDS comprising at least components (A) and (B) of the autodepositing liquid composition according to claim 5; and, if component (C) of the autodepositing liquid composition according to claim 5 is not present in said DDS, (IV) adding to the DDS formed in step (III) sufficient additional material to provide said component (C), wherein step (III) includes at least the following two substages:

(III.1) a primary mixing stage in which there is formed a preliminary DDS which is sufficiently stable that no separation or segregation of bulk phases in the preliminary DDS that is perceptible with normal unaided human vision would occur during storage at 25° C. for at least 5 hours after preparation of the preliminary DDS, in the absence of contact of the preliminary DDS with any substance with which it will chemically react; and (III.2) a particle size refinement stage, in which the preliminary DDS formed in stage (III.1), or an intermediate formed by subjecting the preliminary DDS to at least one prior particle size refinement stage, is forced at least once through an aperture, so as to produce the DDS required to be produced at the end of step (III).

7. A process according to claim 6, in which the film forming polymer molecules in the preliminary DDS have an average particle size that is less than about 450 nm.

8. A process according to claim 6, in which the film forming polymer molecules in the preliminary DDS have an average particle size that is more than about 500 nm and there is at least one intermediate particle size refinement substage between substages (111.1) and (111.2).

9. A process for making an autodepositing liquid composition according to claim 4, said process comprising stops of:

(I) providing a collection of film forming polymer molecules to constitute component (A) of the autodepositing liquid composition;

(II) dissolving the collection of film forming polymer molecules provided in step (I) in a solvent component to form a single phase solution comprising the collection of film forming polymer molecules and the solvent component;

(III) emulsifying the single phase solution formed in step (II), optionally along with other materials, into water, so as to form a DDS in water of at least those parts of the single phase solution formed in step (II) that constitute component (A) of the autodepositing liquid composition according to claim 5, thereby forming a DDS comprising at least components (A) and (B) of the autodepositing liquid composition according to claim 5; and, if component (C) of the a liquid composition according to claim 5 is not present in said DDS, (IV) adding to the DDS formed in step (III) sufficient additional material to provide said component (C).

10. A process according to claim 9, wherein step (III) includes at least the following two substages:

(III.1) a primary mixing stage in which there is formed a preliminary DDS which is sufficiently stable that no separation or segregation of bulk phases in the preliminary DDS that is perceptible with normal unaided human vision would occur during storage at 25° C. for at least 5 hours after preparation of the preliminary DDS, in the absence of contact of the preliminary DDS with any substance with which it will chemically react; and (III.2) a particular size refinement stage, in which the preliminary DDS formed in stage (III.1), or an intermediate formed by subjecting the preliminary DDS to at least one prior particle size refinement stage, is forced at least once through an aperture, so as to produce the DDS required to be produced at the end of step (III).

11. A process according to claim 10, in which the film forming polymer molecules in the preliminary DDS have an average particular size that is less than about 450 nm.

12. A process according to claim 10, in which the film forming polymer molecules in the preliminary DDS have an average particle size that is more than about 500 nm and there is at least one intermediate particle size refinement substage between substages (III.1) and (III.2).

13. A process for making an autodepositing liquid composition according to claim 3, said process comprising steps of:

(I) providing a collection of film forming polymer molecules to constitute component (A) of the autodepositing liquid composition;

(II) dissolving the collection of film forming polymer molecules provided in step (I) in a solvent component to form a single phase solution comprising the collection of film forming polymer molecules and the solvent component;

(III) emulsifying the single phase solution formed in step (II), optionally along with other materials, into water, so as to form a DDS in water of at least those parts of the single phase solution formed in step (II) that constitute component (A) of the autodepositing liquid composition according to claim 3, thereby forming a DDS comprising at least components (A) and (B) of the autodepositing liquid composition according to claim 3 and, if component (C) of the autodepositing liquid composition according to claim 3 is not present in said DDS, (IV) adding to the DDS formed in step (III) sufficient additional material to provide said component (C).

14. A process according to claim 13, wherein step (III) includes at least the following two substages:

(III.1) a primary mixing stage in which there is formed a preliminary DDS which is sufficiently stable that no separation or segregation of bulk phases in the preliminary DDS that is perceptible with normal unaided human vision would occur during storage at 25° C. for at least 5 hours after preparation of the preliminary DDS, in the absence of contact of the preliminary DDS with any substance with which it will chemically react; and (III.2) a particle size refinement stage, in which the preliminary DDS formed in stage (III.1), or an intermediate formed by subjecting the preliminary DDS to at least one prior particle size refinement stage, is forced at least once through an aperture, so as to produce the DDS required to be produced at the end of step (III).

15. A process according to claim 14, in which the film forming polymer molecules in the preliminary DDS have an average particle size that is less than about 450 nm.

16. A process according to claim 14, in which the film forming polymer molecules in the preliminary DDS have an average particle size that is more than about 500 nm and there is at least one intermediate particle size refinement substage between substages (III.1) and (III.2).

17. A process for making an autodepositing liquid composition according to claim 2, said process comprising steps of:

(I) providing a collection of film firming polymer molecules suitable to constitute component (A) of the autodepositing liquid composition;

(II) dissolving the collection of film forming polymer molecules provided in step (I) in a solvent component to form a single phase solution comprising the collection of film forming polymer molecules and the solvent component;

(III) emulsifying the single phase solution formed in step (II), optionally along with other materials, into water, so as to form a DDS in water of at least those parts of the single phase solution formed in step (II) that constitute component (A) of the autodepositing liquid composition according to claim 2, thereby forming a DDS comprising at least components (A) and (B) of the autodepositing liquid composition according to claim 2; and, if component (C) of the autodepositing liquid composition according to claim 2 is not present in said DDS, (IV) adding to the DDS formed in step (III) sufficient additional material to provide said component (C).

18. A process according to claim 17, wherein step (III) includes at least the following two substages:

(III.1) a primary mixing stage in which there is formed a preliminary DDS which is sufficiently stable that no separation or segregation of bulk phases in the preliminary DDS that is perceptible with normal unaided human vision would occur during storage at 25° C. for at least 5 hours after preparation of the preliminary DDS, in the absence of contact of the preliminary DDS with any substance with which it will chemically react; and (III.2) a particle size refinement stage, in which the preliminary DDS formed in stage (III.1), or an intermediate formed by subjecting the preliminary DDS to at least one prior particle size refinement stage, is forced at least once through an aperture, so as to produce the DDS required to be produced at the end of step (III).

19. A process for making an autodepositing liquid composition according to claim 1, said process comprising steps of:

(I) providing a collection of film forming polymer molecules to constitute component (A) of the autodepositing liquid composition;

(II) dissolving the collection of film forming polymer molecules provided in step (I) in a solvent component to form a single phase solution comprising the collection of film forming polymer molecules and the solvent component;

(III) emulsifying the single phase solution formed in step (II), optionally along with other materials, into water, so as to form a DDS in water of at least those parts of the single phase solution formed in step (II) that constitute component (A) of the autodepositing liquid composition according to claim 1, thereby forming a DDS comprising, at least components (A) and (B) of the autodepositing liquid composition according to claim 1; and, if component (C) of the autodepositing liquid composition according to claim 1 is not present in said DDS, (IV) adding to the DDS formed in step (III) sufficient additional material to provide said component (C).

20. A process according to claim 19, wherein step (III) includes at least the following two substages:

(III.1) a primary mixing stage in which there is formed a preliminary DDS which is sufficiently stable that no separation or segregation of bulk phases in the preliminary DDS that is perceptible with normal unaided human vision would occur during storage at 25° C. for at least 5 hours after preparation of the preliminary DDS, in the absence of contact of the preliminary DDS with any substance with which it will chemically react; and (III.2) a particle size refinement stage, in which the preliminary DDS formed in stage (III.1), or an intermediate formed by subjecting the preliminary DDS to at least one prior particle size refinement stage, is forced at least once through an aperture, so as to produce the DDS required to be produced at the end of step (III).

* * * * *

UNITED STATES PATENT AND TRADEMARK OFFICE
CERTIFICATE OF CORRECTION

PATENT NO. : 6,096,806
DATED : August 1, 2000
INVENTOR(S) : Mueller et al.

It is certified that error appears in the above-identified patent and that said Letters Patent is hereby corrected as shown below:

Column 33,
Line 3, delete "1 ,2-epoxide", and insert -- 1,2-epoxide --.
Line 45, delete "total".
Line 46, delete "contains", and insert -- contain --.
Line 63, delete "covalent", and insert -- equivalent --.

Column 34,
Between the first appearing structural formula and the second appearing structural formula, insert -- where --.
Replace the second appearing structural formula with the following:

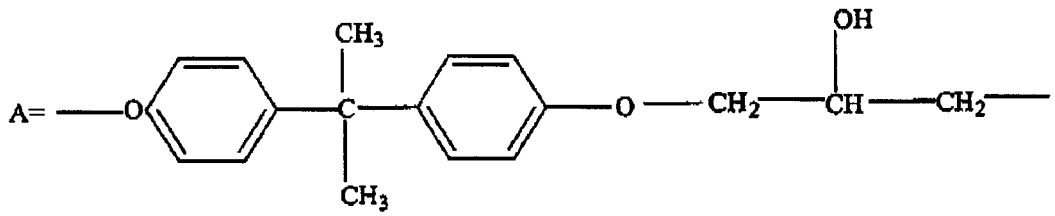

Line 39, after "of", delete ":", and insert -- ; --.
Line 42, after "composition", delete ":", and insert -- ; --.

Column 35,
Line 22, delete "stops", and insert -- steps --.
Line 36, delete "claim 5", and insert -- claim 4 --.
Line 39, delete "5", and insert -- 4 --.
Line 39, delete "a", and insert -- autodepositing --.
Line 40, delete "claim 5", and insert -- claim 4 --.
Lines 55 and 64, delete "particular", and insert -- particle --.

UNITED STATES PATENT AND TRADEMARK OFFICE
CERTIFICATE OF CORRECTION

PATENT NO.     : 6,096,806
DATED          : August 1, 2000
INVENTOR(S)    : Mueller et al.

It is certified that error appears in the above-identified patent and that said Letters Patent is hereby corrected as shown below:

Column 36,
Line 21, after "claim 3", insert -- ; --.
Line 57, delete "firming", and insert -- forming --.
Line 58, delete "suitable".

Signed and Sealed this

Twenty-third Day of May, 2006

JON W. DUDAS
*Director of the United States Patent and Trademark Office*